US012669826B1

(12) United States Patent (10) Patent No.: US 12,669,826 B1

Choudry et al. (45) Date of Patent: Jun. 30, 2026

(54) ADAPTIVE MULTI-VEHICLE DATA TRANSMISSION

(71) Applicant: Zoox, Inc., Foster City, CA (US)

(72) Inventors: Muhammad Umar Choudry, Seattle, WA (US); Paul Orecchio, Denver, CO (US); Meredith James Goldman, Redwood City, CA (US); Ravi Gogna, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 89 days.

(21) Appl. No.: 18/428,761

(22) Filed: Jan. 31, 2024

(51) Int. Cl.
B60W 60/00 (2020.01)
G05D 1/226 (2024.01)
H04W 4/40 (2018.01)

(52) U.S. Cl.
CPC ........... G05D 1/226 (2024.01); B60W 60/001 (2020.02); B60W 2554/00 (2020.02); B60W 2555/20 (2020.02); B60W 2556/45 (2020.02); H04W 4/40 (2018.02)

(58) Field of Classification Search
CPC .............................. B60W 60/001; G05D 1/226
See application file for complete search history.

(56) References Cited

U.S. PATENT DOCUMENTS

| | | | | |
|---|---|---|---|---|
| 10,268,191 | B1 * | 4/2019 | Lockwood | G05D 1/2279 |
| 11,325,591 | B2 * | 5/2022 | Kinoshita | B60W 40/04 |
| 2017/0123421 | A1 * | 5/2017 | Kentley | G01C 21/3415 |
| 2018/0136644 | A1 * | 5/2018 | Levinson | G06N 20/00 |
| 2018/0136651 | A1 * | 5/2018 | Levinson | G05D 1/0027 |
| 2018/0356821 | A1 * | 12/2018 | Kentley-Klay | G01C 21/3415 |
| 2019/0196465 | A1 * | 6/2019 | Hummelshøj | G05D 1/0038 |
| 2020/0201315 | A1 * | 6/2020 | Gogna | H04L 43/08 |
| 2020/0282980 | A1 * | 9/2020 | Kinoshita | G05D 1/0027 |

* cited by examiner

*Primary Examiner* — Jess Whittington

(74) *Attorney, Agent, or Firm* — Lee & Hayes, P.C.

(57) ABSTRACT

A vehicle can connect to multiple vehicles and can determine network metrics (e.g., available bandwidth, latency, signal strength, etc.) associated with the multiple vehicles and at least one cellular network. As the vehicle traverses an environment, the vehicle can collect sensor data of the environment and/or vehicle data (e.g., vehicle pose, diagnostic data, etc.). Based on the network parameters, the vehicle can optimize the use of the connection with the multiple vehicles and/or the cellular network to transmit the sensor data and/or the vehicle data to a remote computing device.

20 Claims, 13 Drawing Sheets

400

FIRST RANGE 410

FOURTH RANGE 416

THIRD RANGE 414

SECOND RANGE 412

700

800 ⟶

900 ⤳

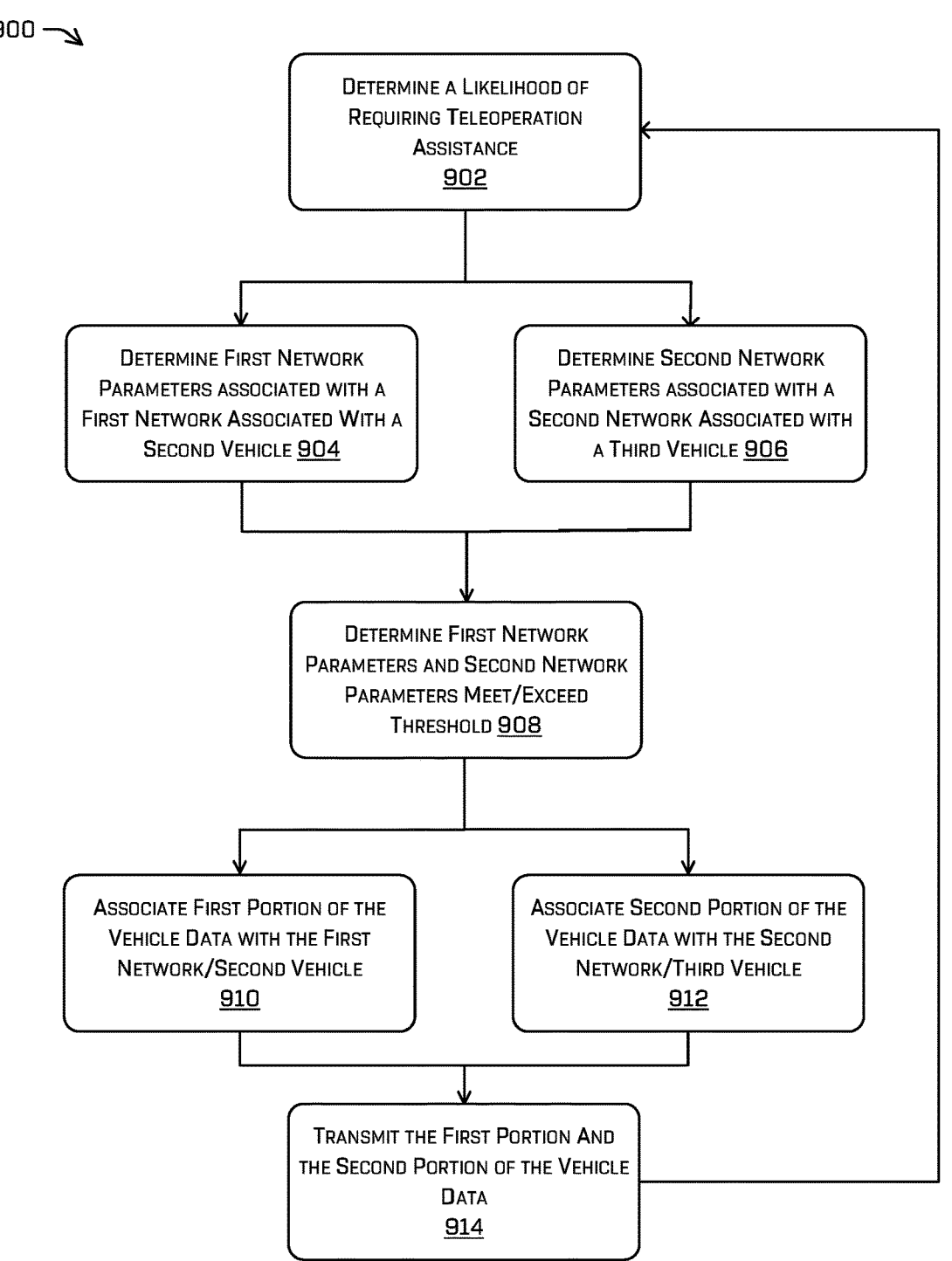

DETERMINE A LIKELIHOOD OF
REQUIRING TELEOPERATION
ASSISTANCE
902

DETERMINE FIRST NETWORK
PARAMETERS ASSOCIATED WITH A
FIRST NETWORK ASSOCIATED WITH A
SECOND VEHICLE 904

DETERMINE SECOND NETWORK
PARAMETERS ASSOCIATED WITH A
SECOND NETWORK ASSOCIATED WITH
A THIRD VEHICLE 906

DETERMINE FIRST NETWORK
PARAMETERS AND SECOND NETWORK
PARAMETERS MEET/EXCEED
THRESHOLD 908

ASSOCIATE FIRST PORTION OF THE
VEHICLE DATA WITH THE FIRST
NETWORK/SECOND VEHICLE
910

ASSOCIATE SECOND PORTION OF THE
VEHICLE DATA WITH THE SECOND
NETWORK/THIRD VEHICLE
912

TRANSMIT THE FIRST PORTION AND
THE SECOND PORTION OF THE VEHICLE
DATA
914

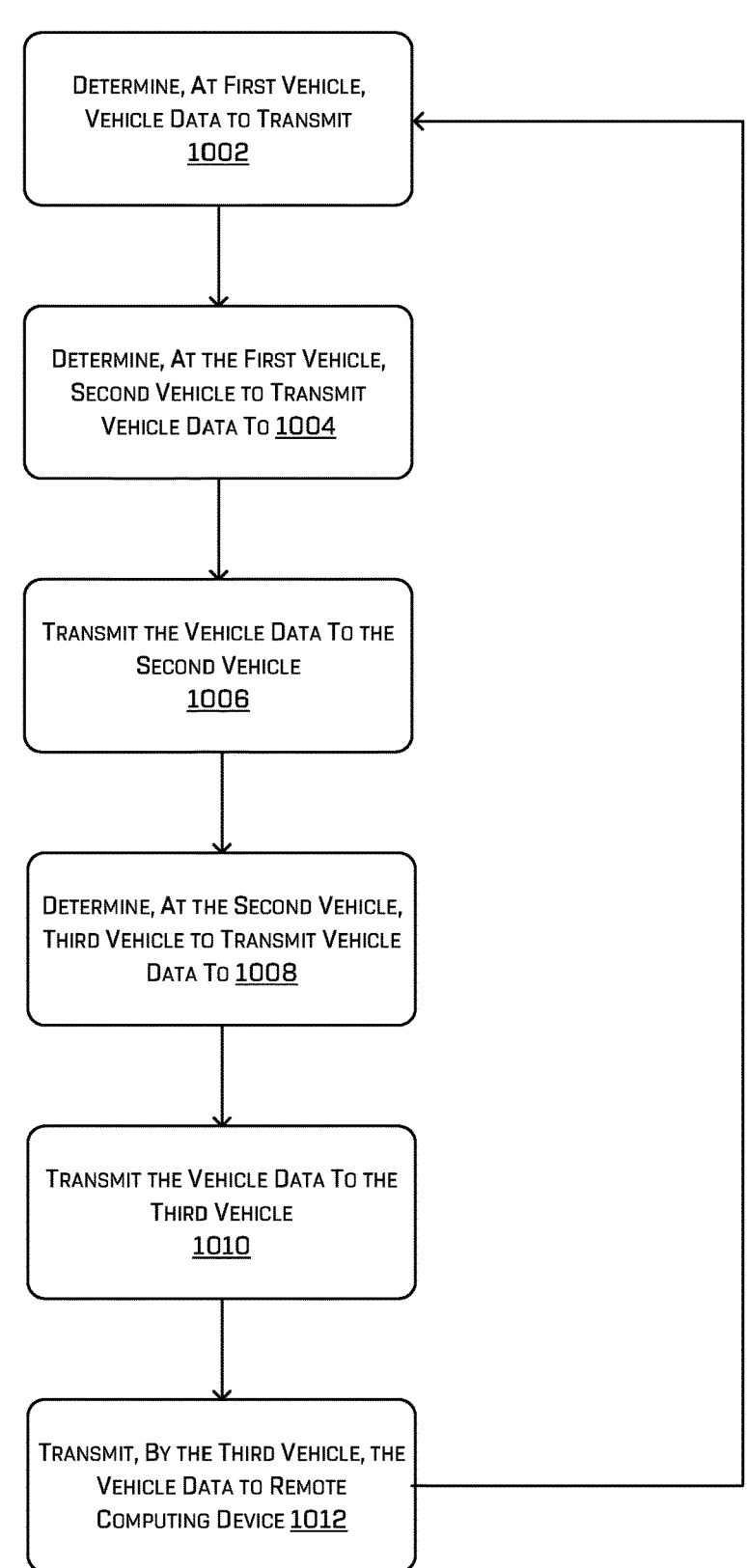

DETERMINE, AT FIRST VEHICLE,
VEHICLE DATA TO TRANSMIT
1002

DETERMINE, AT THE FIRST VEHICLE,
SECOND VEHICLE TO TRANSMIT
VEHICLE DATA TO 1004

TRANSMIT THE VEHICLE DATA TO THE
SECOND VEHICLE
1006

DETERMINE, AT THE SECOND VEHICLE,
THIRD VEHICLE TO TRANSMIT VEHICLE
DATA TO 1008

TRANSMIT THE VEHICLE DATA TO THE
THIRD VEHICLE
1010

TRANSMIT, BY THE THIRD VEHICLE, THE
VEHICLE DATA TO REMOTE
COMPUTING DEVICE 1012

FIG. 10

1200 →
1202
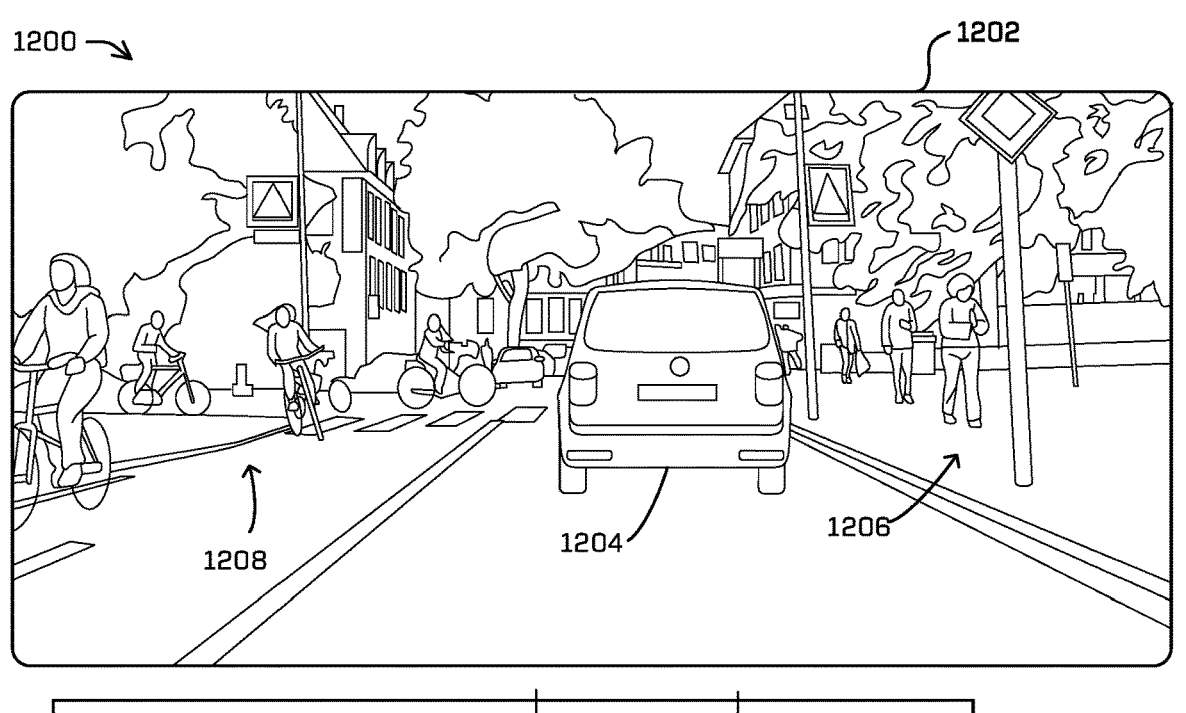
1208     1204     1206
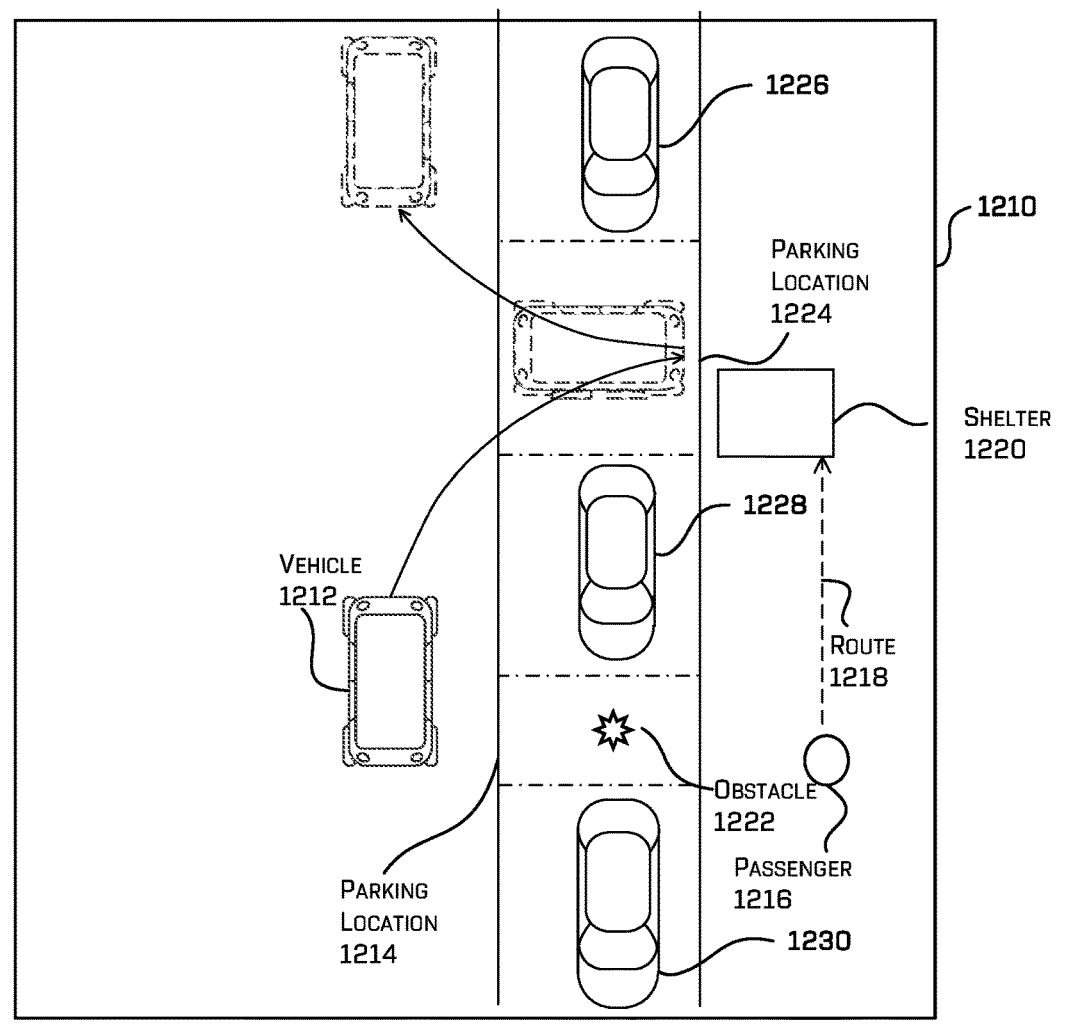
1226
1210
PARKING
LOCATION
1224
SHELTER
1220
1228
VEHICLE
1212
ROUTE
1218
OBSTACLE
1222
PARKING
LOCATION
1214
PASSENGER
1216
1230
FIG. 12

ADAPTIVE MULTI-VEHICLE DATA TRANSMISSION

BACKGROUND

A vehicle can connect to a network to transmit and receive data with a remote computing device. During operation of the vehicle, the network can experience congestion resulting in reduced network performance. The reduced network performance can lead to suboptimal performance of the vehicle's communication with, for example, the remote computing device.

BRIEF DESCRIPTION OF THE DRAWINGS

The detailed description are described with reference to the accompanying figures. In the figures, the left-most digit(s) of a reference number identifies the figure in which the reference number first appears. The use of the same reference numbers in different figures indicates similar or identical components or features.

FIG. 9 depicts a flow diagram representative of one or more first alternative processes for the adaptive multi-vehicle data transmission architecture.

FIG. 10 depicts a flow diagram representative of one or more second alternative processes for adaptive multi-vehicle data transmission architecture.

FIG. 12 depicts example scenarios of when a vehicle may request teleoperation assistance and uses an adaptive multi-vehicle data transmission architecture to request and/or receive teleoperation assistance.

DETAILED DESCRIPTION

Figure 1:
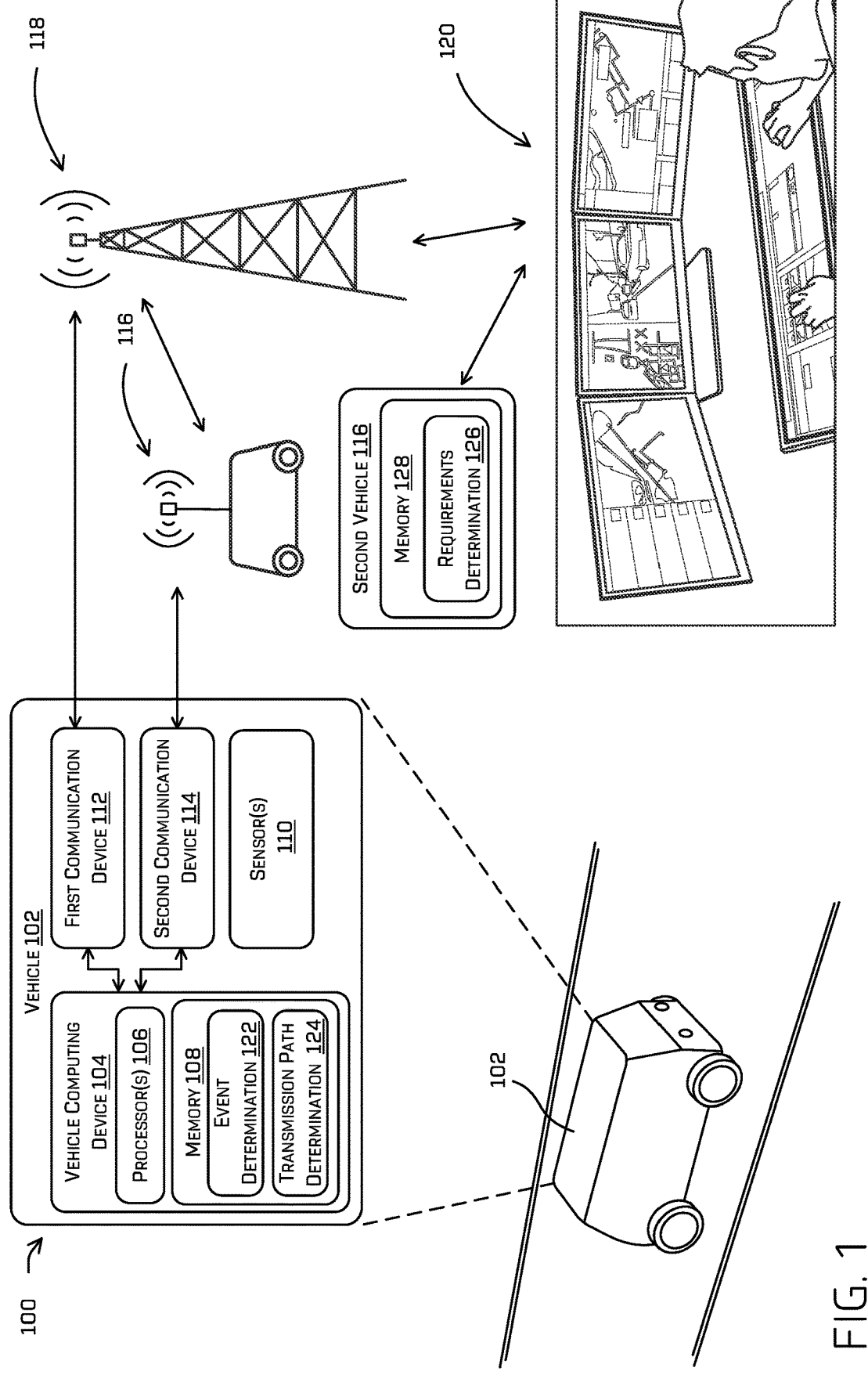
FIG. 1 depicts an example block diagram of a vehicle traversing through an environment while in communication with a remote computing device.

This disclosure describes systems, methods, and apparatuses for an adaptive transmission architecture for transmitting data between multiple vehicles and/or between one or more vehicles and a remote computing device. For example, an autonomous vehicle can connect to one or more other vehicles to transmit vehicle data generated and/or determined by the autonomous vehicle. In some examples, the vehicle data can include sensor data captured by a sensor of the autonomous vehicle, diagnostic data of the autonomous vehicle, and/or trajectory data indicating a trajectory of the autonomous vehicle. Additionally, in some examples, the autonomous vehicle can measure, determine, and/or receive network metric (also referred to as network measurements, signal parameters, connectivity metric, network parameter, and/or network data) associated with networks associated with the one or more other vehicles and one or more suitability metrics associated with the one or more other vehicles. In some examples, the network metric can include a connection between the vehicle and the one or more other vehicles. In some examples, based on the network metric, the autonomous vehicle can determine the other vehicle to connect to and transmit the vehicle data through. Additionally, in some examples, using the network metric, the vehicle can prioritize and/or optimize the transmission of the vehicle data.

In some examples, a vehicle can include multiple modems (also referred to as communication devices) capable of connecting to one or more wireless networks and/or wirelessly connecting to one or more other vehicles. For example, a vehicle can include a first modem capable of connecting to a first wireless network that is associated with a wireless network service and a second modem capable of wirelessly connecting to one or more other vehicles. In some examples, the wireless network service may be a cellular service. In some examples, the wireless connection between the vehicle and the one or more other vehicles may be a wireless local area network (wireless LAN). In some examples, the vehicle can include a single modem that can connect to both the wireless network and the one or more other vehicles. In some examples, the vehicle can have the first modem, the second modem capable of wirelessly connecting to a second vehicle, and a third modem capable of wirelessly connecting to a third vehicle. In some examples, the second vehicle may further be connected to a second wireless network and the third vehicle may further be connected to a third wireless network. In some examples, the first wireless network, second wireless network, and the third wireless network can be associated with the same wireless network provider or different wireless network providers such as the same cellular network or different cellular networks. In some examples, the first wireless network, the second wireless network, third wireless network may be associated with different wireless protocols and/or different frequency and wavelength. In some examples, having access to multiple networks associated with different wireless protocols can reduce the probability of traversing through a location and/or an event that does not provide network availability due to varying network coverage.

As the vehicle operates it can capture and/or determine data associated with the vehicle (also referred to as vehicle data). For example, the vehicle data can include vehicle status data, vehicle diagnostic data, and vehicle telemetry data. The vehicle status data can indicate that the vehicle is an operating mode, a standby mode, and/or a fault mode. The vehicle diagnostic data can indicate a battery status/charge data, vehicle log data (e.g., a data log including the operations that the vehicle has received and/or operations that the vehicle has executed), and/or an occupancy of the vehicle. The vehicle telemetry data can include steering control data and/or acceleration control data.

In some examples, the vehicle data can additionally or alternatively include sensor data captured by one or more sensors where the sensor data is associated with an environment. The one or more sensors can include time-of-flight sensors, lidar sensors, radar sensors, sonar sensors, image sensors, audio sensors, infrared sensors, location sensors, etc., or any combination thereof, although other types of sensors are contemplated. The sensor data can be associated with objects such as buildings, trees, vehicles, pedestrians. In some examples, the sensor data can be associated with road markers and/or road signs.

Using the sensor data, the vehicle can, using a vehicle computing device, determine a trajectory for the vehicle to follow and safely navigate the environment. For example, the trajectory can include a path along a streets and/or roads where the vehicle has determined that it is safe for the vehicle to travel along. In some examples, the vehicle can determine a trajectory that includes pulling the vehicle over onto a shoulder or a side of a road to avoid obstacles in the road.

As the vehicle traverses the environment, in some examples, the vehicle can determine that it needs, based on the sensor data, teleoperation assistance at a first time or that there is a likelihood that it will require teleoperation assistance from the remote computing device at a second time after the first time. In some examples, the vehicle can determine the likelihood based on historical data. In some examples, the historical data may be associated with a location and/or a time. The historical data may include, but are not limited to, event data, weather data, time data, a percentage of the vehicles that requested teleoperation assistance and the location and/or the time, and/or the like. In some examples, the vehicle can determine, based on the likelihood being above a threshold likelihood, to request teleoperation assistance at the second time.

For example, the historical data may indicate that during the morning and/or the evening the location is filled with commuting pedestrians and vehicles, thus resulting in a densely populated area, and in response to all of the objects (e.g., the pedestrians and vehicles) that a vehicle passing through the location detects, the vehicle would request and/or receive teleoperation assistance. As another example, the location may be associated with an arena, and the time data may include schedules for events at the arena such as a sporting event or a concert. The historical data may further indicate that during events at the arena vehicles that passes by the location often requests and/or receives teleoperation assistance (e.g., teleoperation assistance requests exceeding a request threshold).

In some examples, determining the likelihood the first vehicle can further determine whether the second vehicle and/or the third vehicle will be requesting and/or receiving teleoperation assistance based on a trajectory of the second vehicle and/or the third vehicle and/or based on historical data associated with the location.

In some examples, the vehicle can determine to, based on the likelihood exceeding the threshold likelihood and/or requiring teleoperation assistance at the first time, transmit or prepare to transmit some or all of the vehicle data. For example, the vehicle can transmit vehicle data such as location data to a remote computing device to enable tracking of the vehicle. In some examples, the vehicle can transmit vehicle data such as image data captured by an image sensor of the vehicle to the remote computing device to monitor the vehicle's perspective of the environment.

As discussed above, the vehicle can include multiple modems capable of connecting to one or more networks and/or one or more other vehicles. As the vehicle traverses the environment, the vehicle can monitor one or more network metrics associated with the networks and/or the vehicles. For example, the vehicle can monitor network metrics such as bandwidth data, signal strength data, latency data, jitter data, and/or error rate data, although other types of network parameters are contemplated. In some examples, the vehicle can also monitor a suitability metric associated with one or more of the other vehicles. In some examples, determining the suitability metric of the second vehicle can include determining a computing requirement of the second vehicle, a likelihood of requesting teleoperation assistance by the second vehicle, and/or a connectivity requirement associated with the second vehicle.

In some examples, based on the network metric, the vehicle can determine whether to connect to use a cellular network or to wirelessly connect to another vehicle. In response, the vehicle can monitor first network metric associated with transmitting the vehicle data to the remote computing device via the cellular network and second network metric associated with wirelessly connecting to the second vehicle. In some examples, the vehicle can determine, based on the first network metric and the second network metric, whether to connect to the cellular or the second vehicle. For example, the network metric can indicate that the cellular network has more bandwidth available (or lower latency, higher signal strength, and the like) than the wireless connection to the second vehicle.

Alternatively, in some examples, the vehicle can monitor the first network metric associated with a cellular network that the vehicle is connected to and determine that the cellular network has insufficient bandwidth data, signal strength data, latency data, and/or the like to transmit the vehicle data to the remote computing device within a threshold period of time. In such examples, the vehicle can determine that there is another vehicle, e.g., a second vehicle and/or a third vehicle, capable of being connected to. As a result, the vehicle can monitor second network metric associated with the second vehicle and third network metric of the third vehicle and determine, based on the second network metric and the third network metric, the second vehicle or the third vehicle to connect to. For example, the vehicle can determine, based on the second network metric and the third network metric, that bandwidth data and/or a latency (and/or a signal strength and/or the like) associated with the second vehicle is at or above a threshold bandwidth and/or latency (and/or a signal strength and/or the like), that bandwidth data and/or a latency associated with the third vehicle is below the threshold bandwidth and/or latency, and as a result determine to connect to the second vehicle to transmit the vehicle data to the remote computing device.

In some examples, the vehicle can determine, based on the second network metric and the third network metric, that both the second vehicle and the third vehicle are above the threshold bandwidth and/or latency (and/or a threshold signal strength and/or the like). In such an example, the vehicle can portion the vehicle data into a first portion and a second portion and simultaneously transmit the first portion to the remote computing device via the second vehicle and the second portion to the remote computing device via the third vehicle. In some examples, the first portion and the second portion may be a same size. In some examples, the first portion may be a different size than the second portion based on the second network metric and the third network metric. For example, the second network metric and the third network metric can indicate that the second vehicle has more bandwidth available (or lower latency, higher signal strength, and the like) than the third network, and therefore, the vehicle can portion the vehicle data such that the first portion is larger than the second portion. Alternatively, in the example where the second vehicle has more bandwidth available (or lower latency, higher signal strength, and the like) than the third network, the vehicle can transmit all of the vehicle data via the second network even though both the second network and the third network meet and/or exceed the threshold bandwidth and/or latency.

In some examples, the vehicle can, in response to determining that the first network (e.g, the cellular network) is insufficient for transmitting the vehicle data, send a connection request to the second vehicle and/or the third vehicle. In some examples, the second vehicle and/or the third vehicle can receive the connection request and determine a capability status associated with itself. In some examples, the second vehicle and/or the third vehicle can determine the suitability metric. In some examples, suitability metric can include determining a second likelihood that the second vehicle and/or the third vehicle will require teleoperation assistance. In some examples, determining the second likelihood can correspond to determining the likelihood in association with the first vehicle. In some examples, the second vehicle and/or the third vehicle can determine based on a connectivity requirement associated with the suitability metric, whether moving the second vehicle and/or the third vehicle from the current location to a second location would at least improve the bandwidth data, the latency, and/or the signal strength such that the bandwidth data, the latency, and/or the signal strength meets or exceeds the threshold bandwidth, latency, and/or signal strength such that the second and/or the third vehicle can transmit the vehicle data from the vehicle to the remote computing device.

In some examples, the computing requirement associated with the suitability metric may be associated with whether the second vehicle and/or the third vehicle is currently traversing through or expected to travel through a densely populated environment, whether the second vehicle and/or the third vehicle is carrying one or more passengers or expected to carry one or more passengers, a current and/or future weather condition, a current and/or future road condition, current and/or future time of the day, a computing requirement associated with a current task, and/or the like. In some examples, sufficiency of the computing requirement may be determined by determining whether the computing requirement exceeds a threshold computing requirement.

In some examples, the vehicle can transmit the vehicle data by first transmitting the vehicle data to the second vehicle, the second vehicle can transmit the vehicle data to the third vehicle, and the third vehicle can transmit the vehicle data to the remote computing device (e.g., transmitting the vehicle data using a daisy chain that includes the second vehicle and the third vehicle). For example, this type of transmission may be used when the second vehicle may not have sufficient bandwidth data, latency, signal strength, and/or the like to transmit the vehicle data to the remote computing device (either via a cellular network or a direct connection with the remote computing device), but has sufficient bandwidth data, latency, signal strength, and/or the like to transmit the vehicle data to the third vehicle, and the third vehicle has sufficient bandwidth data, latency, signal strength, and/or the like to transmit the vehicle data to the remote computing device. In some examples, when the vehicle determines that it can send the vehicle data through a first chain or a second chain, the vehicle can prioritize sending the vehicle data through the chain with the lowest amount of vehicles involved and/or through the chain with the lowest overall latency.

Additionally, in some examples, the vehicle can access network map data to determine the network metrics associated with the cellular network, the second vehicle, and the third vehicle. In some examples, the network map data can indicate the locations of the second vehicle and the third vehicle, the first network metric, the second network metric, the third network metric, and the like. For example, the vehicle can, prior to traversing the environment, store the network map data at the vehicle computing device or in a storage accessible to the vehicle computing device. In some examples, the vehicle can receive the network map data as it traverses the environment and/or receive network map data updates as it traverses the environment. In some examples, the vehicle can transmit its own measured network metric and its current location to the remote computing device and the remote computing device can use the measured network metric and the current location to update the network map data. Based on the network map data, the vehicle computing device can determine whether to connect to the cellular network, the second vehicle, and/or the third vehicle to transmit the vehicle data.

Alternatively, in some examples, the vehicle, the second vehicle, the third vehicle, and/or a fourth vehicle may be connected together with a vehicle-to-vehicle mesh network. In some examples, the vehicle may be a first node, the second vehicle may be a second node, the third vehicle may be a third node, and/or the fourth network may be a fourth node within the vehicle-to-vehicle mesh network. In some examples, any of the vehicles may be connected to one or more cellular networks and communicate with the remote computing device. In some examples, the vehicle data may be transmitted from the vehicle to the remote computing device to via one or more of the second vehicle, the third vehicle, or the fourth vehicle. As an example, the vehicle may determine that none of the modem(s) that is connect to one or more cellular networks has insufficient bandwidth, latency, and/or signal strength to transmit the vehicle data via the cellular networks, and, in response, determine whether the second vehicle, the third vehicle, and/or the fourth network have sufficient bandwidth, latency, and/or signal strength to transmit the vehicle data to the remote computing device. Further, upon determining that the fourth vehicle has sufficient bandwidth, latency, and/or signal strength to transmit the vehicle data to the remote computing device, the vehicle can further determine the transmission path to transmit the vehicle data to the fourth vehicle (e.g., via the second vehicle and/or the third vehicle if the vehicle does not have sufficient signal strength to transmit directly to the fourth vehicle).

In some examples, the vehicle can determine the transmission path to transmit the vehicle data by determining and selecting the transmission path with at least the lowest latency and/or the shortest number of intermediary nodes that the vehicle data will pass through. As a first example, the vehicle can determine that the vehicle data can be transmitted to the remote computing device via a first transmission pathway of the second vehicle, the third vehicle, and a fourth vehicle or a second transmission pathway of the second vehicle and the fourth vehicle. In such an example, the vehicle can determine to transmit the vehicle data using the second transmission pathway because the second transmission pathway uses less intermediary nodes than the first transmission pathway. As a second example, the vehicle can determine that the vehicle data can be transmitted to the remote computing device via a third transmission pathway of the second vehicle and the fourth vehicle or a fourth transmission pathway of the third vehicle and the fourth vehicle. In such an example, the vehicle can determine that a latency associated with the third transmission pathway is lower than a latency associated with the fourth transmission pathway and, in response, transmit the vehicle data via the third transmission pathway.

In some examples, the vehicle can continuously monitor the vehicle-to-vehicle mesh network and dynamically adjust one or more transmission pathways within between itself and one or more other vehicles in the mesh network. In some examples, the other vehicles may enter or leave the mesh network as vehicles enter and leave the geographic region associated with the vehicle. For example, a fifth vehicle can enter within communication range (e.g., based on bandwidth, latency, signal strength, and/or location) of the vehicle, the second vehicle, the third vehicle, and/or the fourth vehicle and be added as a node within the mesh network, and the third vehicle can exit the communication range of the vehicle, the second vehicle, the fourth vehicle, and/or the fifth vehicle and be removed as a node within the mesh network. In such an example, the vehicle can dynamically determine transmission pathways via the fifth vehicle and remove a previously determined transmission pathways via the third vehicle.

In some examples, the vehicle can further determine that the second vehicle, the third vehicle, and/or the fourth vehicle may be relocated from their current location to a new location within the mesh network to further improve the bandwidth, the latency, and/or signal strength between the vehicle and the second vehicle, the third vehicle, and/or the fourth vehicle. In some examples, the vehicle can determine that there is not sufficient bandwidth, latency, and/or signal strength along the cellular network to transmit the vehicle data to the remote computing device and there is no vehicle to connect to on the mesh network, but there is sufficient cellular network bandwidth, latency, and/or signal strength to send a request to the remote computing network to request that a sixth vehicle be relocated proximate the vehicle's location such that the vehicle can transmit the vehicle data to the remote computing device via the sixth vehicle.

In some examples, the vehicle can receive guidance from the remote computing device. For example, the vehicle can transmit the vehicle data over the one or more cellular networks to the remote computing device. As discussed above, the vehicle data can include location data and sensor data. In some examples, the vehicle can encounter an event that represents a safety concern and/or includes uncertainty. The vehicle can be configured to detect the safety concern and/or the uncertainty and transmit a request, in addition to the vehicle data, to the remote computing device. In some examples, the remote computing device can be associated with a teleoperator (also referred to as a teleop). The teleoperator can assess the situation and provide guidance to the vehicle. After receiving the guidance (and/or a command, in general), the vehicle can continue operation in order to achieve a safe outcome in response to the event.

Additionally, the techniques discussed herein can improve a functioning of a computing device by increasing the ability for the computing device to maintain a connection to a remote computing device and/or improve the connection to the remote computing device. For example, a computing device associated with a vehicle can determine that a cellular network is unavailable but that a second vehicle is available for connection and transmission of vehicle data to the remote computing device. Then, the computing device can transmit data using the second vehicle to ensure an uninterrupted communication with the remote computing device. In some examples, the computing device can determine that the second vehicle is associated with a lower latency and/or a higher bandwidth than the third vehicle and/or the cellular network and can transmit the vehicle data using the second vehicle.

Therefore, the functioning of a computing device can be improved by increasing the computing device's ability to maintain a consistent connection and/or improving the data transfer performance of the computing device. As can be understood, maintaining and/or improving a network connection with a vehicle can improve safety outcomes, particularly in the context of autonomous vehicle. Thus, the techniques described herein can improve a functioning of a computing device as well as improve safety outcomes.

The techniques described herein can be implemented in a number of ways. Example implementations are provided below with reference to the following figures. Although discussed in the context of an autonomous vehicle, the techniques described herein can be applied to a variety of systems requiring determination and detection of objects, and is not limited to autonomous vehicles. In another example, the systems, methods, and apparatuses can be used in an aviation or in a nautical context. Additionally, the techniques described herein can be used with real data (e.g., captured using sensor(s)), simulated data (e.g., generated by a simulator), or any combination of the two.

FIG. 1 illustrates an example environment 100 through which an example vehicle 102 is traveling. The example vehicle 102 can be a driverless vehicle, such as an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such examples, because the vehicle 102 can be configured to control all functions from start to completion of the trip, including all parking functions, it may not include a driver and/or controls for driving the vehicle 102, such as a steering wheel, an acceleration pedal, and/or a brake pedal. This is merely an example, and the systems and methods described herein may be incorporated into any ground-borne, airborne, or waterborne vehicle, including those ranging from vehicles that need to be manually controlled by a driver at all times, to those that are partially or fully autonomously controlled.

The example vehicle 102 can be any configuration of vehicle, such as, for example, a van, a sport utility vehicle, a cross-over vehicle, a truck, a bus, an agricultural vehicle, and/or a construction vehicle. The vehicle 102 can be powered by one or more internal combustion engines, one or more electric motors, hydrogen power, any combination thereof, and/or any other suitable power sources. Although the example vehicle 102 has four wheels, the systems and methods described herein can be incorporated into vehicles having fewer or a greater number of wheels, tires, and/or tracks. The example vehicle 102 can have four-wheel steering and can operate generally with equal or similar performance characteristics in all directions, for example, such that a first end of the vehicle 102 is the front end of the vehicle 102 when traveling in a first direction, and such that the first end becomes the rear end of the vehicle 102 when traveling in the opposite direction. Similarly, a second end of the vehicle 102 is the front end of the vehicle when traveling in the second direction, and such that the second end becomes the rear end of the vehicle 102 when traveling in the opposite direction. These example characteristics may facilitate greater maneuverability, for example, in small spaces or crowded environments, such as parking lots and/or urban areas.

The vehicle 102 can include a vehicle computing device 104. The vehicle computing device 104 can include one or more processors 106 and memory 108 communicatively coupled to the one or more processors 106. The one or more processors 106 can include, for example, one or more FPGAs, SoCs, ASICs, and/or CPUs. The vehicle 102 can be used to travel through the environment 100 and determine and/or capture data. For example, the vehicle computing device 104 can determine vehicle status data, vehicle diagnostic data, and/or vehicle telemetry. In some examples, the vehicle 102 can include one or more sensors 110 where the one or more sensors 110 can include one or more time-of-flight sensors, lidar sensors, radar sensors, sonar sensors, image sensors, audio sensors, infrared sensors, location sensors, etc., or any combination thereof, although other types of sensors are contemplated.

As the vehicle 102 travels through the environment 100, the sensors 110 can capture sensor data associated with the environment 100. For example, some of the sensor data can be associated with objects (e.g., trees, vehicles, and/or pedestrians). In some examples, the sensor data can be associated with other objects including, but not limited to, buildings, road surfaces, signage, barriers, etc. In some examples, the vehicle computing device 104 can determine information about objects in the environment, such as bounding boxes, classifications, segmentation information, and the like.

The vehicle computing device 104 can use the sensor data to generate a trajectory for the vehicle 102. In some examples, the vehicle computing device 104 can also determine pose data associated with a position of the vehicle 102. For example, the vehicle computing device 104 can use the sensor data to determine position data, coordinate data, and/or orientation data of the vehicle 102 in the environment 100. In some examples, the pose data can include x-y-z coordinates and/or can include pitch, roll, and yaw data associated with the vehicle 102.

The vehicle 102 can also include one or more communication devices. For example, FIG. 1 illustrates the vehicle 102 as including a first communication device 112 (also referred to as a first modem or a first communication connection) and a second communication device 114 (also referred to as a second modem or a second communication connection). The first communication device 112 can be associated with a first wireless protocol and the second communication device 114 can be associated with a second wireless protocol different from the first wireless protocol. For example, the first wireless protocol can be a cellular protocol. In some examples, the vehicle 102 may be configured to connect to a cellular network via a communication tower 118. For example, the communication tower 118 can be associated with wireless frequency bands of a first network that are supported by the first communication device 112. In some examples, the communication tower 118 may be associated with one or more cellular networks.

In some examples, and as illustrated in FIG. 1, the first communication device 112 may be configured to transmit data via the communication tower 118 to a remote computing device 120. Without limitation, the remote computing device 120 may be associated with a teleoperator or other remote assistance device. For example, should the vehicle 102 encounter a situation or event that prevents the autonomous vehicle from navigating, e.g., navigating safely, along a trajectory, and the autonomous vehicle cannot readily determine a (safe) alternative trajectory, the vehicle 102 may transmit a request for assistance to the remote computing device using the first communication device 112, e.g., via a cellular network at least partially enabled by the communication tower.

In some examples, normal operation of the vehicle 102 may have the vehicle 102 communicate with the remote computing device 120 (e.g., the teleoperator) using the first communication device 112. However, in some instances, the network associated with the first communication device 112 may be unavailable or otherwise unsuitable for communication between the vehicle 102 and the remote computing device 120. Accordingly, in these and/or other examples, the vehicle 102 may communicate with the remote computing device 120 using the second communication device 114.

In the illustrated example, the second communication device 114 facilitates communication via a protocol different from the protocol used to communicate over the first network using the first communication device. For example, the second communication device 114 can include functionality to communicate wirelessly over a second wireless protocol different from the first wireless protocol discussed above. In some example, the second wireless protocol may be a wireless protocol used to establish a local area network (LAN) or the like. In some instances, the second network can be associated with wireless frequency bands of a second network that are supported by the second communication device 114.

In examples of this disclosure, the second communication device 114 may be used by the vehicle 102 to communicate with the second vehicle 116. For instance, continuing with the example discussed above in which the vehicle 102 encounters a situation that requires assistance from the remote computing device 120, the vehicle 102 can communicate with the remote device 120 using the second communication device 114, e.g., via the second network, when the first network is insufficient, unavailable, or the like. More specifically, in the example illustrated, the vehicle 102 may use the second communication device 114 to communicate with the vehicle 116, and the second vehicle 116 may in turn communicate with the remote computing device 120. In this way, the second vehicle 116 may act as a relay or node between the vehicle 102 and the remote computing device 120. In examples, and as detailed further herein, the vehicle 102 and the second vehicle 116, and optionally the remote computing device 120, may comprise a mesh network.

In some examples, the wireless connection between the vehicle 102 and the second vehicle 116 may be a non-public (e.g., private) peer-to-peer (also referred to as vehicle-to-vehicle) connection between the vehicle 102 and the second vehicle 116 and data between two vehicles does not pass through the Internet (e.g., via a cellular network). In such an example, the vehicle 102 and the second vehicle 116 may be in a vehicle-to-vehicle mesh network, where the vehicle 102 is a first node within the mesh network and the second vehicle 116 is a second node within the mesh network. In some examples, the mesh network may include a third vehicle, a fourth vehicle, and/or an n-th vehicle that serve as a third node, a fourth node, and/or an n-th node. The mesh network can also include as a node a remote computing device 120, and/or the remote computing device 120 may be otherwise configured for communicating with one or more of the second vehicle 116, the third vehicle, the fourth vehicle, and/or the n-th vehicle.

In some examples, the first communication device 112 and the second communication device 114 can be substantially similar and can both connect to either the first network and/or the second network. In some examples, the first network and the second network can be associated with the same network provider and/or network operator. In some examples, the first network and the second network can be associated with different network providers and/or network operators.

Providing the first network and the second network may facilitate multiple, different transmission paths for the vehicle 102 to obtain assistance, e.g., from the remote computing device 120. Although the example of FIG. 1 shows the vehicle 102 and the second vehicle 116, in some examples additional vehicles may be associated with the second network. For instance, the vehicle 102 and the second vehicle 116 may be part of a fleet of similar (or the same) vehicles all with capability for wirelessly communicating via a communication protocol (e.g., a wireless communication protocol).

In examples, and as noted above, the vehicle 102 can use the communication devices 112, 114 to request assistance, e.g., from the remote computing device. Accordingly, and as illustrated in FIG. 1, the memory 108 of the vehicle 102 can include an event determination component 122. For example, the event determination component 122 can include functionality to determine that the vehicle 102 has encountered a scenario or is likely to encounter a scenario that requires assistance from an external operator, e.g., from a teleoperator. The event determination component 122 can determine, based on the vehicle 102 encountering the scenario that requires assistance from the teleoperator, to transmit a request for assistance to the remote computing device 120. In some instances, the event determination component can also determine to transmit information associated with the request, e.g., sensor data, log data, and/or the like.

In some examples, the event determinator component 122 can determine a likelihood associated with the vehicle 102 requesting teleoperation assistance based on historical data. The historical data may include, but are not limited to, location data, event data, weather data, time data, a percentage of the vehicles that requested teleoperation assistance at the location and/or during the time or the event, and/or the like. In some examples, the vehicle 102 can determine that the vehicle 102 is likely to request teleoperation assistance when the likelihood associated with requesting teleoperation assistance being above a threshold likelihood. As a first example, the event determinator component 122 can determine that because a trajectory of the vehicle 102 passes by an arena and the historical data indicates that a time associated with the vehicle 102 passing by the arena is associated with a concert or a sporting event, resulting in the trajectory passing through a densely populated area, that the vehicle 102 is likely to request teleoperation assistance. As a second example, the event determinator component 122 can determine, based on the historical data, that the trajectory of the vehicle 102 passes through a densely populated area due to morning or evening rush hour traffic and therefore is likely to request teleoperation assistance.

As also illustrated in FIG. 1, the memory 108 of the vehicle 102 may include a transmission path determination component 124. The transmission path determination component 124 can include functionality to determine how to transmit data, e.g., a request for assistance to the remote computing device 120 as determined by the event determination component 122. Specifically, the transmission path determination component 124 can include functionality to determine whether to transmit data via the first communication device 112 (e.g., via a first data path over a first (cellular) network), via the second communication device 114 (e.g., via a second data path over a second (mesh) network), or via a combination of both.

In examples, the transmission path determination component 124 can determine attributes of the first network and/or the second network. Such attributes can include, but are not limited to network latency, network bandwidth, and/or other factors. For example, the transmission path determination component 124 may decide against using a wireless network when that network is inoperative, is bandwidth-constrained, has poor latency, and/or is otherwise undesirable for requesting assistance from the remote computing device 120 . . . . Similarly, the transmission path determination component 124 can include functionality to assess connectivity metrics between the first vehicle 102 and the second vehicle 116.

Moreover, because the second network is a mesh network, the transmission path determination component can include functionality to assess connectivity metrics between and/or among other nodes on the network. For example, the transmission path determination component 124 can also include functionality to receive information from other nodes, e.g., from the second vehicle 116, to assess aspects of the second network.

In some examples, individual of the nodes, including the second vehicle 116 can include a memory 128 that stores a requirements determination component 126. The requirements determination component 126 can include functionality to determine a suitability of the second vehicle 116 to act as a node for transmitting a request from the vehicle 102 to the remote computing device 120. In some examples, determining the suitability of the second vehicle 116 to act as a node for transmitting the request from the vehicle 102 to the remote computing device can include, but are not limited to, determining whether a computing requirement the second vehicle 116 is expected to use and/or is currently in use is sufficient, determining a probability that the second vehicle 116 will need to request teleoperation assistance, determining a network capability associated with the second vehicle 116, and/or the like.

In some examples, the requirements determination component 126 can determine the sufficiency of the computing requirement based on whether the second vehicle 116 is currently traversing through or expected to travel through a densely populated environment, whether the second vehicle 116 is carrying one or more passengers or expected to carry one or more passengers, a current and/or future weather condition, a current and/or future road condition, current and/or future time of the day, a computing requirement associated with a current task, and/or the like. In some examples, the requirements determination component 126 can determine the sufficiency by determining whether the computing requirement exceeds a threshold computing requirement.

For example, when the requirements determination component 126 determines that the second vehicle 116 is traversing through a densely populated area or will be traversing through a densely populated area, it can determine that the second vehicle 116 may be unsuitable to be used as a node to transmit the vehicle data because of an increase in computing requirement needed by a perception component and/or a prediction component to assist the second vehicle 116 to safely traverse through the densely populated area exceeds the threshold computing requirement. For another example, the requirements determination component 126 can determine that the second vehicle 116 is unsuitable because the current and/or future weather condition (e.g., rain, snow, fog, and/or the like), road condition (e.g., uneven road surfaces, unclear road markers, and/or the like), time of the day (dawn, dusk, and/or night) causes or likely would cause the second vehicle 116 to require increased computing requirements to safely traverse the environment that exceeds the threshold computing requirement. For a third example, the requirements determination component 126 can determine that because the second vehicle 116 is carrying one or more passengers, that the computing requirements needed to be prioritized to safely transport the passengers to their destination(s) exceeds the threshold computing requirement and therefore, the second vehicle 116 is unsuitable to serve as the node. Alternatively, in some examples, the requirements determination component 126 may be configured to prefer unoccupied vehicles to serve as nodes.

In some examples, the computing requirement may be determined first because without sufficient computing requirement, the second vehicle 116 be unable to be the node irrespective of whether the second vehicle 116 is requesting or will be requesting teleoperation assistance or whether the second vehicle 116 has sufficient network capability. In some examples, when the requirements determination component 126 determines that there is insufficient computing requirement, the requirements determination component 126 can transmit to the transmission path determination component 124 an indication that the second vehicle 116 is unsuitable as a node. In such an example, the transmission path determination component 124 can determine whether there is a third vehicle in the mesh network that can serve as a node for transmitting the vehicle data based on an indication determined by a second requirements determination component associated with the third vehicle. In some examples, the third vehicle may be of the same type as at least the second vehicle 116 and the second requirements determination component may be of the same type and/or perform the same function as the requirements determination component 126.

In some examples, the requirements determination component 126 can determine that the second vehicle 116 is currently requesting teleoperation assistance or is likely to request teleoperation assistance from the remote computing device 120 or another remote computing device. In some examples, the requirements determination component 126 can determine a likelihood associated with teleoperation assistance based on historical data. The historical data may include, but are not limited to, location data, event data, weather data, time data, a percentage of the vehicles that requested teleoperation assistance at the location and/or during the time or the event, and/or the like. In some examples, the vehicle 102 can determine that the second vehicle 116 is likely to request teleoperation assistance when the likelihood associated with requesting teleoperation assistance being above a threshold likelihood. For example, the requirements determination component 126 can determine that the vehicle will traverse proximate an arena during an event (e.g., a concert, a sporting event, or the like) and determine, based on the historical data, that the likelihood of requiring teleoperation exceeds the threshold likelihood. In such an example, the requirements determination component 126 can make its determination based on the historical data indicating that during events at the arena, the percentage of vehicles requesting teleoperation assistance exceeds the threshold likelihood. In some examples, the requirements determination component 126 can determine that when the second vehicle 116 is currently requesting teleoperation assistance or likely to request teleoperation assistance, the second vehicle 116 is unsuitable to be the node. Additionally, the requirements determination component

126 can further determine suitability by determining requesting teleoperation assistance would cause the computing requirement to exceed the threshold computing requirement and/or cause the network capability to be below a connectivity threshold, thereby rendering the second vehicle 116 unsuitable to be the node.

In some examples, the requirements determination component 126 can determine the network capability associated with the second vehicle 116 by determining a transmission requirement that includes a first connectivity metric between the vehicle 102 and the second vehicle 116, and at least one of a second connectivity metric associated with the direct wireless connection between the second vehicle 116 and the remote computing device 120 (e.g., bandwidth data associated with the direct wireless connection, latency data associated with the direct wireless connection, signal strength associated with the direct wireless connection, error data rate associated with the direct wireless connection, and/or the like) or a third connectivity metric associated with transmitting data from the second vehicle 116 to the remote computing device 120 via the communication tower 118 (e.g., bandwidth data associated with the communication tower 118, latency data associated with the communication tower 118, signal strength associated with the communication tower 118, error data rate associated with the communication tower 118, and/or the like).

In some examples, the requirements determination component 126 can determine that the first connectivity metric and/or at least one of the second connectivity metric or the third connectivity metric is below a connectivity threshold and in response determine that data requirements indicate the second vehicle 116 to be unsuitable to be the node. Alternatively or additionally, in some examples, when the requirements determination component 126 determines that the first connectivity metric and/or at least one of the second connectivity metric or the third connectivity metric is below the connectivity threshold, the requirements determination component 126 can further determine a second location different from a current location of the second vehicle 116 where the transmission requirement associated with the second vehicle 116 will be above the connectivity threshold and determine whether the second vehicle 116 is capable of traversing to the second location (e.g., whether the second vehicle 116 is currently unoccupied and does not have a ride request, whether the second location is along the trajectory of the second vehicle 116, and/or the like). If yes, the second vehicle 116 may navigate to the second location, and the requirements determination components 126 can indicate to the transmission path determination component 124 that the second vehicle 116 is suitable to be the node.

In some examples, when the vehicle 102 requests teleoperation assistance, the vehicle 102 can transmit the vehicle data or a portion of the vehicle data to the remote computing device 120. For example, the vehicle can transmit the vehicle data such as location data to the remote computing device 120 to enable tracking of the vehicle. In some examples, the remote computing device 120 can include a server that stores the location data in a database. In some examples, the remote computing device 120 can be operated by a person as depicted in FIG. 1.

In some examples, while operating, the vehicle 102 can encounter an event that is unpredictable in nature, represents safety concerns, or requires responses to spontaneous visual cues or direction from, for example, police officers or construction workers. The vehicle 102 can be configured to detect an uncertainty associated with an action (e.g., by determining confidence level(s) associated with a maneuver and/or event). Upon identifying such uncertainty, the vehicle 102 can send a request to a teleoperations device (e.g., the remote computing device 120) to obtain guidance to resolve the uncertainty and proceed.

During conventional operation of the vehicle 102, the vehicle 102 may communicate with the remote computing device 120 using the first communication device 112, e.g., via a wireless network facilitated by the communication tower 118. However, according to aspects of this disclosure, data generated by and/or otherwise transmitted from the vehicle 102 can in some instances be additionally or alternatively routed to the remote computing device 120 via the second vehicle 116 (and/or one or more additional vehicles) acting as an intermediary for transmitting the data.

In some examples, as illustrated in FIG. 1, the second vehicle 116 can receive the vehicle data from the vehicle 102 and transmit the vehicle data to the remote computing device 120 via a wireless direct connection (as illustrated by arrows to and from the second vehicle 116 and the remote computing device 120) and/or via the communication tower 118 (as illustrated by arrows to and from the second vehicle 116 and the communication tower 118).

In some examples, the transmission path determination component 124 can determine whether to transmit the vehicle data via the second vehicle 116 and the communication tower 118 to the remote computing device 120 and/or via the direct wireless connection between the second vehicle 116 and the remote computing device 120 based on the second connectivity metric and the third connectivity metric. In some examples, the first vehicle 102 can determine to send the vehicle data via the communication tower 118 based on the third connectivity metric being greater than the second network metric. In some examples, the first vehicle 102 can determine to send the vehicle data via the direct wireless connection based on the second network metric being greater than the first network metric.

In some examples, when both the second connectivity metric and the third connectivity metric meet or exceed the connectivity threshold and when the second network metric and the third network metric are substantially similar or within a range of each other, the first vehicle 102 can portion the vehicle data into a first portion and a second portion such that the first portion is transmitted via the direct connection and the second portion is transmitted via the communication tower 118. In some examples, the first portion and the second portion can be simultaneously transmitted. In some examples, the first portion and the second portion may be a same size. In some examples, the first portion may be a different size than the second portion based on the first network metric and the second network metric. For example, when the second network metric is higher than the third network metric, the first vehicle 102 can portion the vehicle data such that the first portion is larger than the second portion.

Additionally, in some example, when the wireless connection between the first communication device 112 and the communication tower 118 is available, the same type of portioning may be performed such that portions of the vehicle data are transmitted via all available wireless networks.

In some examples, the vehicle 102 can determine, based on connectivity metrics, that multiple vehicles on the mesh network, including the second vehicle 116, has sufficient suitability as described in association with second vehicle 116 above such that at least some of the vehicles are suitable to transmit vehicle data to the remote computing device 120. In such an example, the vehicle 102 can determine to portion the vehicle data such that each portion may be simultaneously transmitted by all suitable vehicles (e.g., some or all of the other vehicles would transmit a portion of the vehicle data). In some examples, this can lower at least the bandwidth requirement for transmitting the vehicle data. In some examples, when the communication tower 118 is also determined to have sufficient connectivity, the vehicle data may additionally be portioned such that a portion is also transmitted via the communication tower 118.

Following the teleoperation assistance request to the remote computing device 120, a user interface associated with the remote computing device 120 can quickly and accurately apprise the teleoperator of the situation. In some examples, the vehicle 102 can transmit vehicle data (e.g., sensor data captured by sensors 110 and/or operation state data) with the request. In response to the request, a teleoperator can provide guidance (also referred to as a command) to the vehicle 102. In some examples, the remote computing device 120 can determine the guidance based at least on the request, sensor data, and/or vehicle state data.

The remote computing device 120 can be configured to provide network map data to the vehicle 102. As discussed above, the vehicle 102 can be configured to access network map data to determine the network metrics associated with the communication tower 118 and the second vehicle 116. The remote computing device 120 can provide the network map data prior to the vehicle 102 operating in the environment 100 and/or be configured to provide network map updates as the vehicle 102 traverse the environment 100. In some examples, the vehicle 102 can measure and/or record network metric determined by the vehicle 102 as it traverses the environment 100 and transmit the measured network parameters to the remote computing device 120.

In some examples, the vehicle 102 can receive network map data that includes a parameter index (e.g., a time parameter, an event parameter, a location parameter, and/or a weather parameter) and the vehicle 102 can determine whether to send the vehicle data using the first communication device 112 or the second communication device 114. In some examples, event parameter may associate the network parameters with an event. For example, the event parameter can indicate that the first network between the first communication device 112 and the communication tower 118 has an available bandwidth at a particular location as 50 megabits per second at a first time and an available bandwidth at the particular location as 5 megabits per second at a second time where the second time coincided with a concert event. Therefore, during the second time, the vehicle 102 will prioritize transmitting the vehicle data via the second vehicle 116.

FIGS. 2-6 illustrates an example environment with example operations executed by the vehicle computing device and/or by vehicle computing devices associated with one or more other vehicles (e.g., by the second vehicle 116). Each operation can represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described and the processes performed in each FIG are not intended to be construed as a limitation, and any number of the described operations can be combined in any order and/or in parallel to implement the processes (e.g., processes described in connection with FIGS. 2-6 may be combined with any of the other FIGS. 2-6), as discussed herein.

Figure 2:
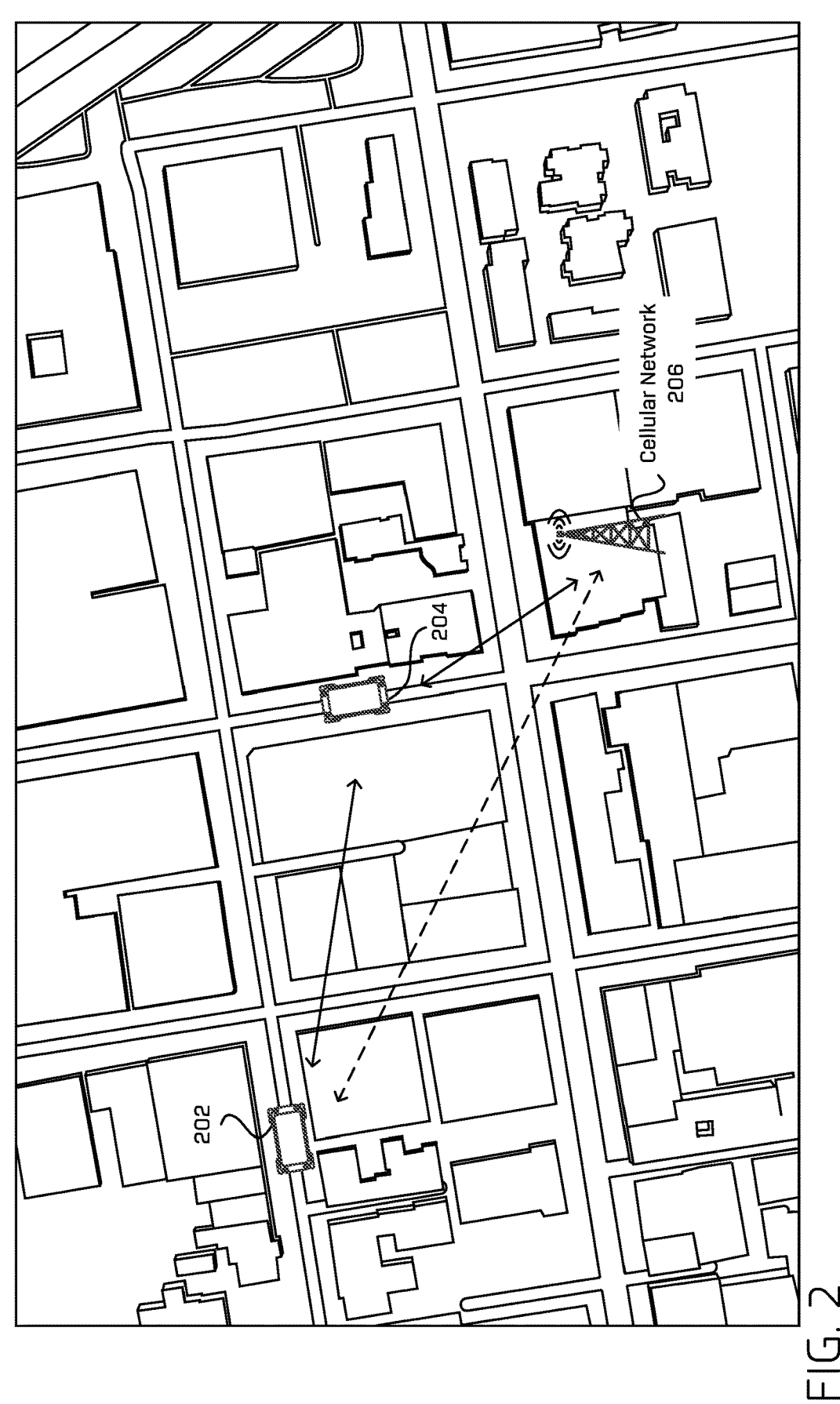
FIG. 2 depicts an example top view of an environment with a vehicle traversing using an adaptive multi-vehicle data transmission architecture.

FIG. 2 illustrates an example environment 200 depicting a top view with a first vehicle 202 traversing the example environment 200 using the adaptive multi-vehicle data transmission architecture. The first vehicle 202 may correspond to the vehicle 102 and a second vehicle 204 may correspond to the second vehicle 116 described above in association with FIG. 1.

In some examples, the first vehicle 202 can determine to transmit vehicle data to a remote computing device such as the remote computing device 120 of FIG. 1. In some examples, as illustrated, the first vehicle 202 can determine, based on first network metric, that its connection to cellular network 206 is insufficient for transmitting the vehicle data or the cellular network 206 is unavailable. In response, the first vehicle 202 can determine another vehicle to connect to in order to (e.g., via a vehicle-to-vehicle mesh network) transmit its vehicle data to a remote computing device via the other vehicle. In the illustrated example of FIG. 2, the first vehicle 202 can determine that a second vehicle 204 is suitable (e.g., based on determining the suitability as described in association with FIG. 1 and includes at least second network metric) to connected to and transmit the vehicle data through.

In some examples, the first network metric and the second network metric can include bandwidth data, signal strength (or field strength) data, latency data, jitter data, error rate data, and/or location data. The bandwidth data can indicate a maximum rate at which information can be transferred. In some examples, the bandwidth data can indicate a data rate such as bits per second. In some examples, the bandwidth data can indicate a measured data rate. In some examples, the measured data rate can be referred to as the throughput.

The signal strength data can indicate the strength of the signal associated with the network. For example, the signal strength of the network can be measured in decibels-milliwatts, arbitrary strength units, and/or reference signals received power.

Latency data can indicate a delay in the network. For example, the latency can indicate the amount of time between the vehicle 202 transmitting vehicle data and a remote computing device receiving the vehicle data.

Jitter data can indicate a variation in the latency in the network.

Error rate data can indicate a rate and/or percentage of data that is incorrect or corrupted compared to the data that is transmitted and received correctly.

In some examples, the first vehicle 202 can estimate the bandwidth data associated prior to transmitting the vehicle data. For example, the vehicle 202 can transmit a first data packet with a small or empty payload and transmit a second data packet with a large payload to a remote computing device via the cellular network 206. In some examples, the vehicle 202 can subsequently or simultaneously transmit a third data packet with the small or empty payload and a fourth pack with the large payload to the remote computing device via the second vehicle 204. The remote computing device can acknowledge receipt of the data packets by responding with an acknowledgement packet. The first vehicle 202 can determine first roundtrip times (also referred to as a response times) associated with the data packets transmitted via the cellular network 206 and estimate an associated first bandwidth by dividing the size of the second data packet with the large payload by the difference in the roundtrip times of the first and second data packets. The first vehicle 202 can further determine second roundtrip times associated with the data packets transmitted via the second vehicle 204 and estimate an associated second bandwidth by dividing the size of the second data packet of the fourth data packet with the large payload by the difference in the roundtrip times of the third and fourth data packets. The first vehicle 202 can use the estimated associated first and second bandwidths to determine whether the cellular network 206 or the second vehicle 204 has sufficient bandwidth (e.g., meets or exceeds a threshold bandwidth) to transmit the vehicle data to the remote computing device. In some examples, the first vehicle 202 can be configured to continually test and estimate bandwidth data and/or other network parameters for some or all networks associated with cellular service and/or vehicles as the first vehicle 202 can connect to as it traverses its environment.

As discussed above, the first vehicle 202 can receive network map data which includes event data associating the network parameters with a current event or an upcoming event associated with a location of the first vehicle 202. In some examples, the vehicle 202 can determine at least the first network parameters based on current or upcoming events. For purposes of illustration only, the network map data can indicate a drop of 50% in available bandwidth associated with the first network when a sporting event occurs at a particular location. The vehicle 202 can determine that a sporting event has begun or will begin at the particular location and determine to transmit the vehicle data via the second vehicle 204.

Based on the vehicle data transmitted to the remote computing device by the vehicle 202, the vehicle 202 can determine a set of utilities and/or commands that are valid to be used and/or issued by a teleoperator associated with the remote computing device. In some examples, the remote computing device can request additional vehicle data. As discussed above, the remote computing device may require the additional vehicle data to provide guidance to the vehicle 202.

Figure 3:
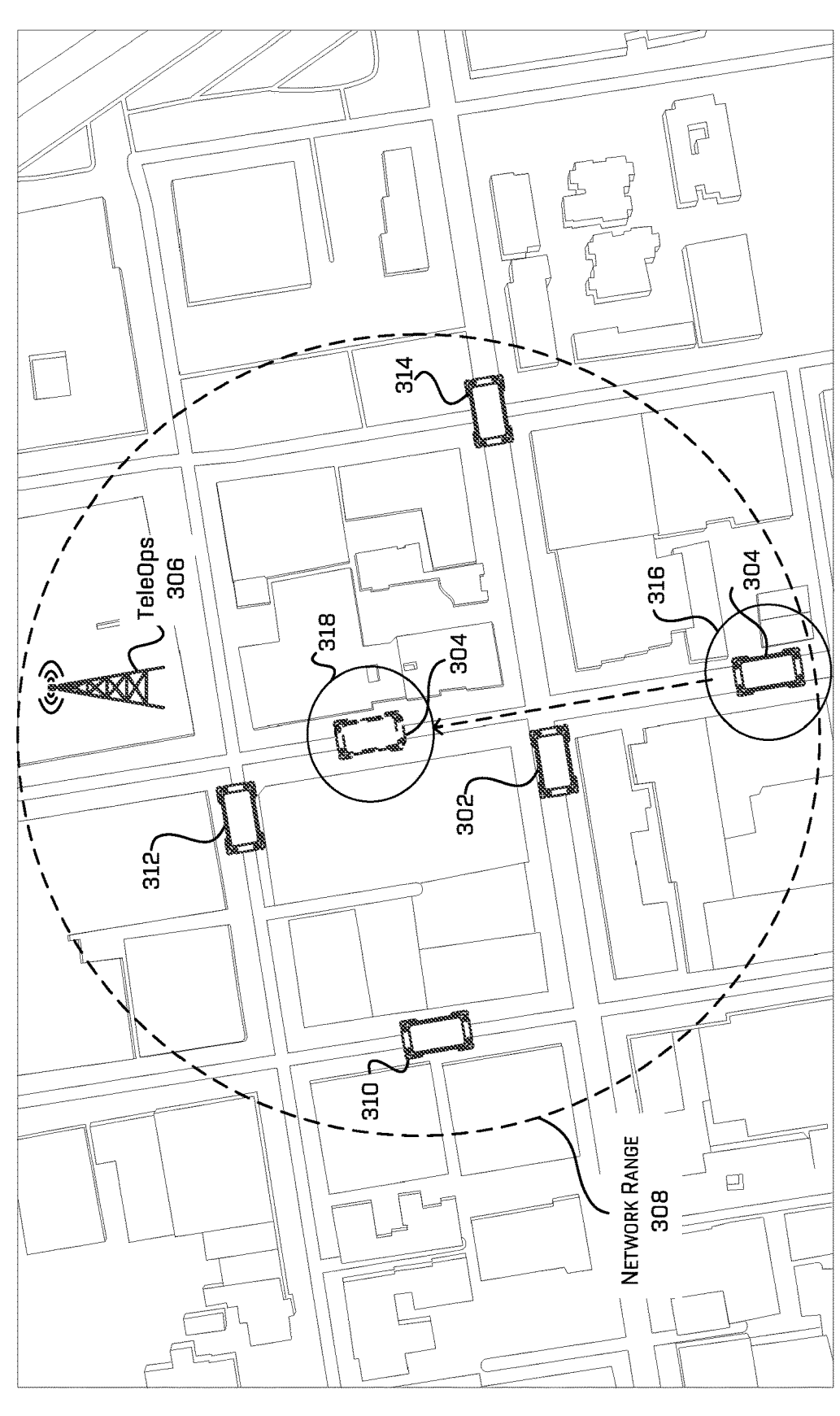
FIG. 3 depicts a first alternative example environment with a vehicle traversing using the adaptive multi-vehicle data transmission architecture.

FIG. 3 illustrates an example environment 300 which can be similar to the example environment 200 described above with reference to FIG. 2. FIG. 3 illustrates a first vehicle 302, a second vehicle 304, a third vehicle 310, a fourth vehicle 312, and fifth vehicle 314. In some examples, the first vehicle 302, the second vehicle 304, the third vehicle 310, and the fourth vehicle 312 may be in a fleet together. In some examples, the first vehicle 302 can correspond to the first vehicle 102 and the first vehicle 202 described in association with FIGS. 1 and 2 and the second vehicle 304 can correspond to the second vehicle 116 and the second vehicle 204 described in association with FIGS. 1 and 2. FIG. 3 also illustrates a network range 308 and a remote computing device 306 (also referred to as teleops 306). In some examples, the teleops 306 can correspond with the remote computing device 120 described in association with FIG. 1. In some examples, the network range 308 is a range associated with a peer-to-peer connection between the second vehicle 304 and another vehicle such as the first vehicle 302 and/or between the second vehicle 304 and a remote computing device such as the teleops 306.

In the example illustrated in FIG. 3, the first vehicle 302 can determine that its connection to the teleops 306 has insufficient bandwidth, latency, signal strength, and/or the like for transmitting its vehicle data to the teleops 306 and can determine, in response, that the second vehicle 304 is suitable to connect to as described in association with FIG. 1.

Alternatively, also in the example illustrated in FIG. 3, the first vehicle 302 can determine that the second vehicle 304 is unsuitable to connect to due to insufficient bandwidth, latency, signal strength, and/or the like for the second vehicle 304 to transmit the vehicle data at its current location 316. In response, and as illustrated in FIG. 3, the second vehicle 304 can determine a second location 318 that the second vehicle 304 can travel to that would provide sufficient bandwidth, latency, signal strength, and/or like to transmit the vehicle data. In addition, after traveling to the second location 318, the second vehicle 304 can determine that, because teleops 306 is now within range of network range 308, it can transmit the vehicle data via a direct wireless connection to the teleops 306 and/or via the cellular network. Additional details with respect to transmitting the vehicle data via the direct wireless connection and/or the cellular network are described in association with FIG. 1, as well as throughout this disclosure.

Additionally or alternatively, the second vehicle 304 can determine in its fleet, vehicles 310, 312, and 314 also require assistance in transmitting their respective vehicle data. In response, the second vehicle 304 can determine that at the second location 318 the network range 308 has at least sufficient bandwidth and network coverage to receive and transmit vehicle data from the vehicles 302, 310, 312, and 314 and move to the second location (e.g. act as a node for the vehicles 302, 310, 312, and 314 to connect and transmit data through). In some examples, one consideration that the second vehicle 304 may use to determine moving to the second location 318 is whether it is free to do so (e.g., the second vehicle 304 is not carrying a passenger and/or its trajectory already takes the second vehicle 304 to the second location or it can alter its trajectory to the second location without impacting the passenger's trip).

Alternatively, in some examples, the second vehicle 304 may act as a mobile command center that is capable of providing teleoperation assistance. In some examples, by moving to the second location 318, the vehicles 302, 310, 312, and 314 can transmit vehicle data to the second vehicle 304 via a peer-to-peer connection without using the cellular network and the second vehicle 304 can provide instructions to the vehicles 302, 310, 312, and 314 in a manner similar to those described in association with the remote computing device 120 of FIG. 1 (e.g., via the peer-to-peer connection). In some examples, transmitting vehicle data via the peer-to-peer connection to the second vehicle 304 or the teleops 306 may be faster and more secure than using the cellular network as the vehicles 302, 304, 310, 312, and 314 would not need to compete with myriad other users on the cellular network for network traffic.

Figure 4:
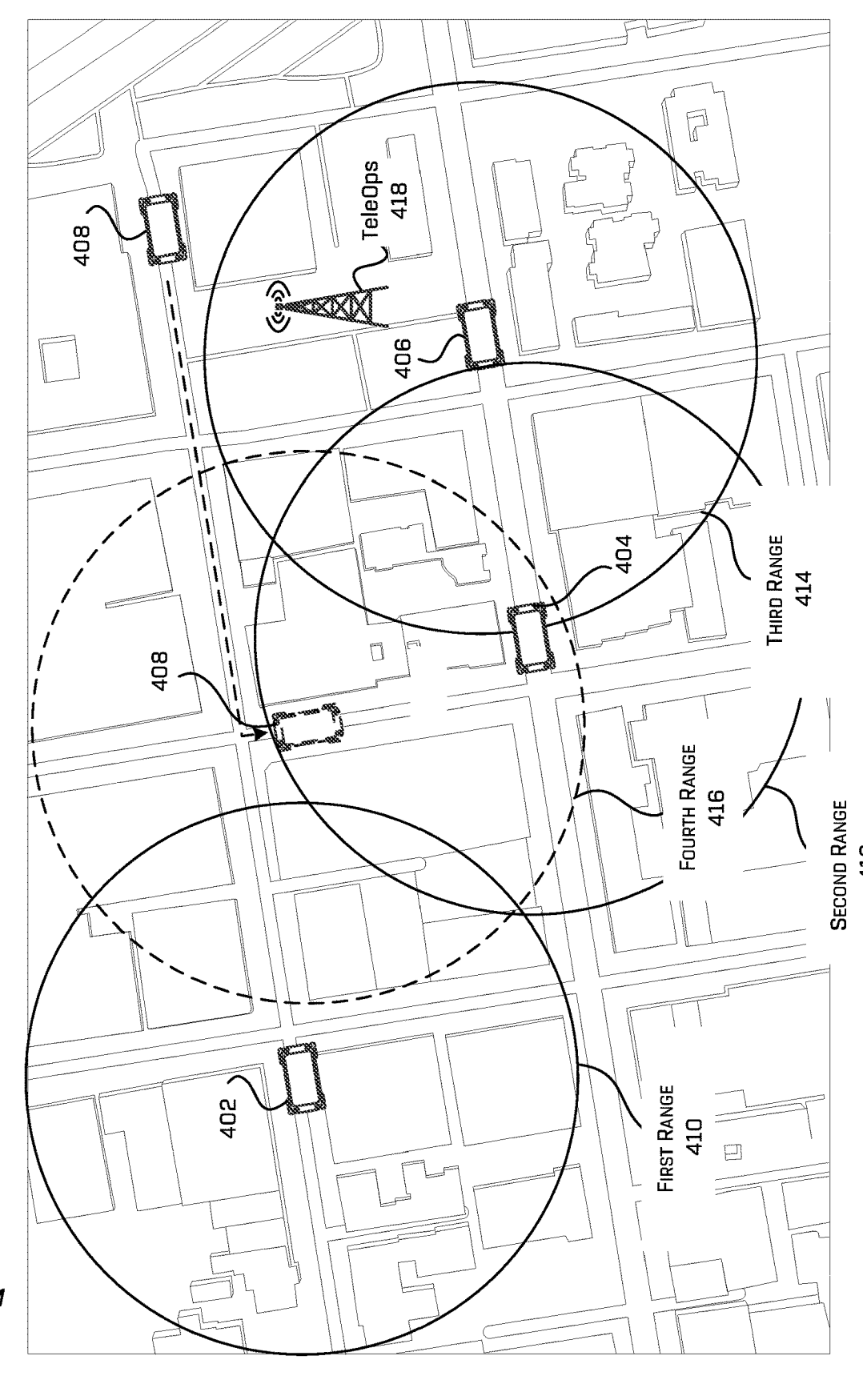
FIG. 4 depicts a second alternative example environment with a vehicle traversing using the adaptive multi-vehicle data transmission architecture.

FIG. 4 illustrates an example environment 400 which can be similar to the example environment 200 or 300 described above with reference to FIGS. 2 and 3. FIG. 4 illustrates a first vehicle 402, a second vehicle 404, a third vehicle 406, and a fourth vehicle 408. In some examples, the first vehicle 402 can correspond to the first vehicle 102 and the first vehicle 202 described in association with FIGS. 1 and 2 and the second vehicle 404 can correspond to the second vehicle 116 and the second vehicle 204 described in association with FIGS. 1 and 2, and the teleops 418 can correspond with the remote computing device 120 described in association with FIG. 1.

In some examples, the first vehicle 402, the second vehicle 404, the third vehicle 406, and the fourth vehicle 408 may be in a fleet together. In some examples, the first vehicle 402, the second vehicle 404, the third vehicle 406, and the fourth vehicle 408 may be connected via a vehicle-tovehicle (e.g., peer-to-peer) mesh network. In such an example, the first vehicle 402 may be a first node within the mesh network, the second vehicle 404 may be a second node within the mesh network, the third vehicle 406 may be a third node within the mesh network, and the fourth vehicle may be a fourth node within the mesh network.

FIG. 4 also illustrates a first range 410, a second range 412, a third range 414, and a fourth range 416 that illustrates the maximum range each of the vehicles 402, 404, 406, and 408, respectively, has as a node within the mesh network. In some examples, the more each of the illustrated ranges overlap, the better bandwidth, latency, and/or signal strength between the vehicles, and the less each of the illustrated overlap, the worse bandwidth, latency, and/or signal strength between the vehicles. For example, as illustrated, the connection between the second vehicle 404 and the third vehicle 406 contains better bandwidth, latency, and/or signal strength than the connection between the first vehicle 402 and the second vehicle 404 because there is greater overlap between the third range 414 and the second range 412 than the first range 410 and the second range 412. In FIG. 4, the solid vehicles and solid network ranges represent the vehicle and network range at current locations and times, and the dashed vehicles and network ranges represent the vehicles and network ranges in future locations.

In the illustrated example of FIG. 4, the third vehicle 406 is capable of directly transmitting data to the teleops 418. For example, as illustrated, the first vehicle 402 can communicate with the second vehicle 404 directly but cannot communicate with the third vehicle 406 directly because the first range 410 and the second range 412 overlap, but the first range 410 and the third range 414 do not overlap. In such an example, if the vehicle 402 uses the mesh network to transmit the vehicle data to teleops 418, the vehicle data would be transmitted first via the second vehicle 404 and then via the third vehicle 406, where the third vehicle 406 transmits the vehicle data to the teleops 418.

Alternatively, as illustrated in FIG. 4, the first vehicle 402 can determine that because of the small overlap between the first range 410 and the second range 412 that there is insufficient bandwidth, latency, and/or signal strength in between the first vehicle 402 and the second vehicle 404 to transmit the vehicle data between the vehicles. In response, the first vehicle 402 can determine that a fourth vehicle 408 is within the environment 400 and/or is connected to the mesh network and may be relocated to a second location such that the vehicle 408 provides better bandwidth, latency, and/or signal strength for transmission of the vehicle data to the teleops 418 (e.g., as illustrated by the fourth range 416). The fourth vehicle 408 may move to the second location based on the determination, based on for example, a request from the first vehicle 402. As another alternative, the first vehicle 402 can request that the second vehicle 404 relocate to the second location.

Alternatively, the first vehicle 402 may determine the starting point and the ending point within the mesh network for transmitting the vehicle data (e.g., that the vehicle data is transmitted to the teleops 418 via the third vehicle 406), but does not determine, after transmitting the vehicle data to the next vehicle, how that data is being transmitted to the third vehicle 406. For examples, after the fourth vehicle 408 receives the vehicle data from the first vehicle 402, the fourth vehicle 408 can determine whether to directly transmit the vehicle data to the third vehicle 406 or to transmit the vehicle data to the second vehicle 404. The fourth vehicle 408 can make this determination based on a bandwidth, latency, and/or signal strength between the fourth vehicle 408 and the second vehicle 404 versus a bandwidth, latency, and/or signal strength between the fourth vehicle 408 and the third vehicle 406, where the fourth vehicle 408 determines to transmit the vehicle data to the vehicle with the more favorable bandwidth, latency, and/or signal strength. Additionally, fourth vehicle 408 can make a further determination between the bandwidth, latency, and/or signal strength between the second vehicle 404 and the third vehicle 406 versus the bandwidth, latency, and/or signal strength between the fourth vehicle 408 and the third vehicle 406 to determine where to transmit the vehicle data through.

While FIG. 4 illustrates that the second vehicle 404 communicates with the teleops 418 using a direct wireless connection (e.g., peer-to-peer), the second vehicle 404 may also or alternatively communicate with the teleops 418 using a cellular network as described in association with FIGS. 1 and 2, as well as throughout this disclosure.

Figure 5:
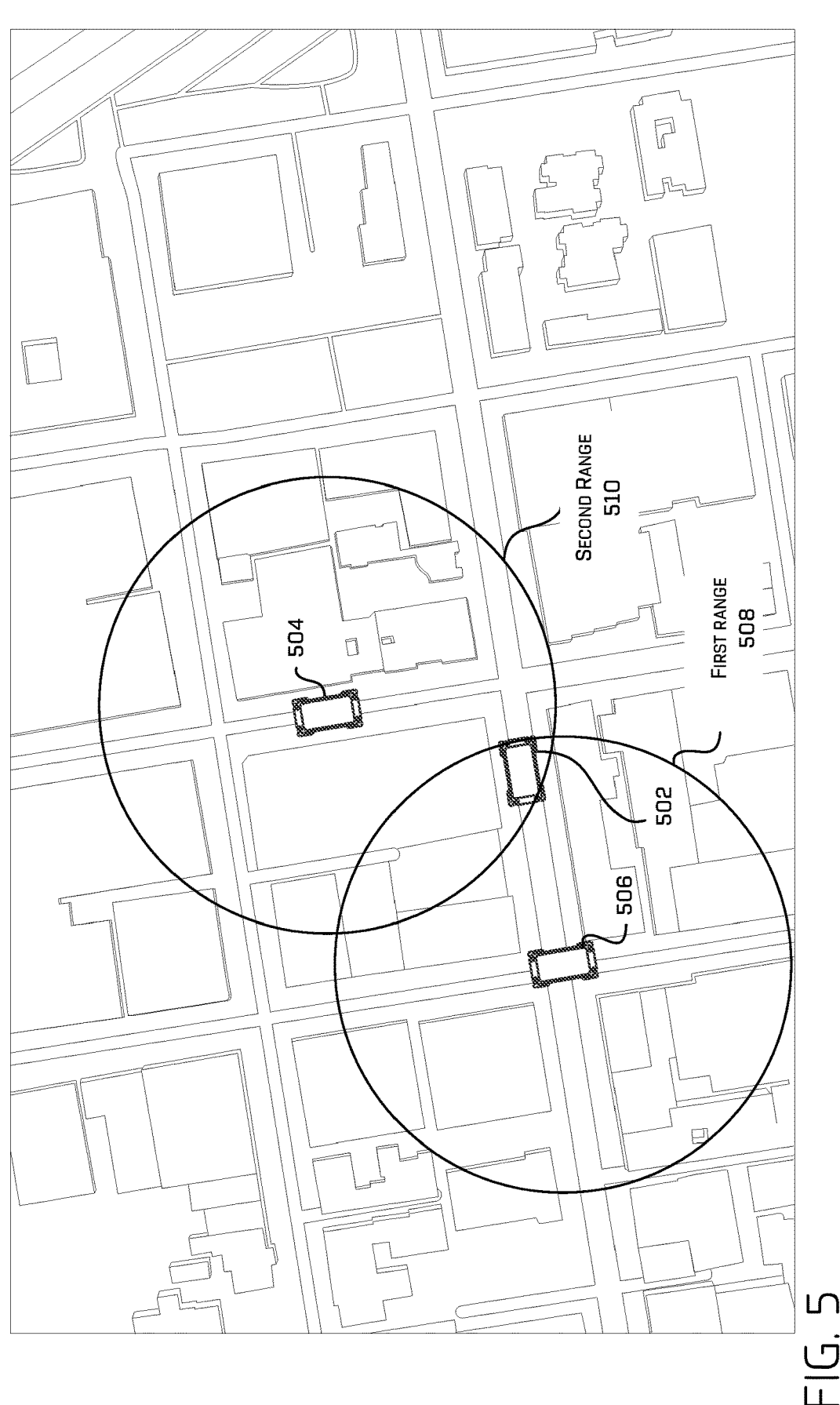
FIG. 5 depicts a third alternative example environment with a vehicle traversing using the adaptive multi-vehicle data transmission architecture.

FIG. 5 illustrates an example environment 500 which can be similar to the example environment 200 or 300 described above with reference to FIGS. 2 and 3. FIG. 5 illustrates a first vehicle 502, a second vehicle 504, and a third vehicle 506. In some examples, the first vehicle 502, the second vehicle 504, and the third vehicle 506 may be in a fleet together and/or may be in a same vehicle-to-vehicle mesh network described in association with FIGS. 1 and 4. In some examples, the first vehicle 502 can correspond to the first vehicle 102 of FIG. 1 and the second vehicle 504 can correspond to the second vehicle 116 of FIG. 1.

In the example illustrated in FIG. 5, the first vehicle 502 can determine that its connection to one or more cellular networks has insufficient bandwidth, latency, signal strength, and/or the like for transmitting its vehicle data to a remote computing device and can determine, in response, that the second vehicle 504 and the third vehicle 506 are both available to connect to to assist in transmitting the vehicle data to the remote computing device (e.g., as illustrated in FIG. 4 by the first vehicle 502 being within both a first range 508 and a second range 510). Based on the availability, the first vehicle 502 can determine a first suitability associated with the second vehicle 504 and a second suitability with the third vehicle 506 as described in association with FIG. 1.

For example, the second vehicle 504 can determine that it is suitable for transmitting the vehicle data via a cellular network connection and the third vehicle 506 can determine that it is unsuitable because its connection to the cellular network does not have sufficient bandwidth transmit the vehicle data. The first vehicle 502 can, in response, elect to transmit the vehicle data via the second vehicle 504. In some examples, the first vehicle 502 can send a data packets to the second vehicle 504 and the third vehicle 506 to determine suitability.

Alternatively, the vehicles 504 and 506 can both indicate each are suitable and have at least sufficient bandwidth. In such an example, the first vehicle 502 can select the network and the vehicle to transmit the vehicle data that has the higher bandwidth, the lower latency, and/or the higher signal strength. Alternatively, the first vehicle 502 can portion its vehicle data into a first portion and the second portion where the first portion is larger than the second portion and transmit the first portion via the vehicle that has the higher bandwidth, the lower latency, and/or the higher signal strength. For example, if the second vehicle 504 has the higher bandwidth, the lower latency, and/or the higher signal strength then the first portion is transmitted using the second vehicle 504. Alternatively, in some examples, both portions may have the same size.

Figure 6:
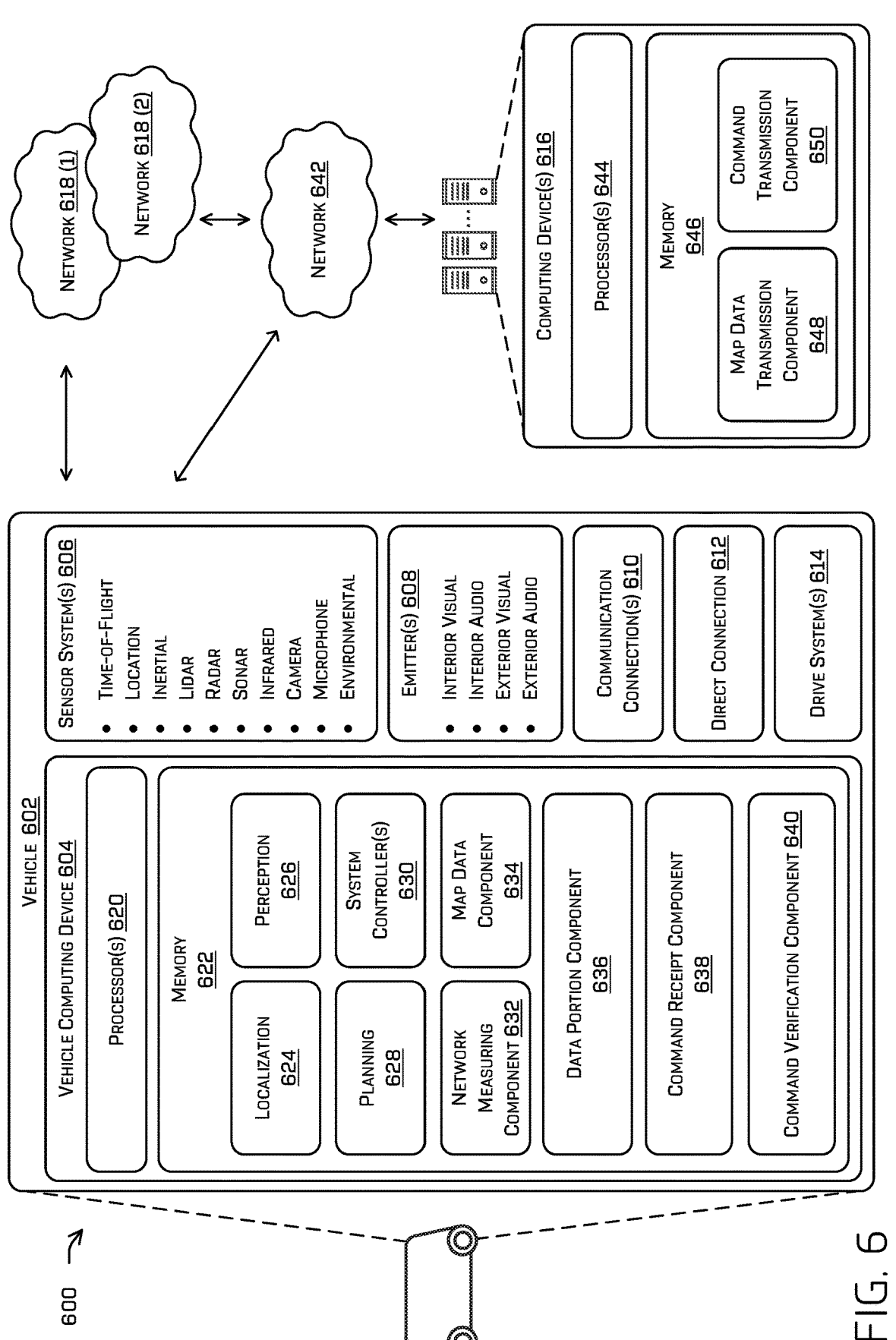
FIG. 6 depicts a block diagram of an example system for implementing the techniques described herein.

FIG. 6 depicts a block diagram of an example system 600 for implementing the techniques discussed herein. In at least one example, the system 600 can include a vehicle 602, which can be similar to the vehicle 102 described above with reference to FIG. 1 and vehicle 202, 302, 402, and 502 described above with reference to FIGS. 2-5. In the illustrated example 600, the vehicle 602 is an autonomous vehicle; however, the vehicle 602 can be any other type of vehicle.

The vehicle 602 can include a vehicle computing device 604, one or more sensor systems 606, one or more emitters 608, one or more communication connections 610 (also referred to as communication devices and/or modems), at least one direct connection 612 (e.g., for physically coupling with the vehicle 602 to exchange data and/or to provide power), and one or more drive systems 614. The one or more sensor systems 606 can be configured to capture sensor data associated with an environment.

The sensor system(s) 606 can include time-of-flight sensors, location sensors (e.g., GPS, compass, etc.), inertial sensors (e.g., inertial measurement units (IMUs), accelerometers, magnetometers, gyroscopes, etc.), lidar sensors, radar sensors, sonar sensors, infrared sensors, cameras (e.g., RGB, IR, intensity, depth, etc.), microphone sensors, environmental sensors (e.g., temperature sensors, humidity sensors, light sensors, pressure sensors, etc.), ultrasonic transducers, wheel encoders, etc. The sensor system(s) 606 can include multiple examples of each of these or other types of sensors. For instance, the time-of-flight sensors can include individual time-of-flight sensors located at the corners, front, back, sides, and/or top of the vehicle 602. As another example, the camera sensors can include multiple cameras disposed at various locations about the exterior and/or interior of the vehicle 602. The sensor system(s) 606 can provide input to the vehicle computing device 604.

The vehicle 602 can also include one or more emitters 608 for emitting light and/or sound, as described above. The emitters 608 in this example include interior audio and visual emitters to communicate with passengers of the vehicle 602. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 608 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which may comprise acoustic beam steering technology.

The vehicle 602 can also include one or more communication connection(s) 610 that enable communication between the vehicle 602 and one or more other local or remote computing device(s) (e.g., a remote teleoperations computing device) or remote services. For instance, the communication connection(s) 610 can facilitate communication with other local computing device(s) on the vehicle 602 and/or the drive system(s) 614. Also, the communication connection(s) 610 can allow the vehicle 602 to communicate with other nearby computing device(s) (e.g., other nearby vehicles, traffic signals, etc.).

The communications connection(s) 610 can include physical and/or logical interfaces for connecting the vehicle computing device 604 to another computing device or one or more external networks 618(1) and/or 618(2) (e.g., the Internet). For example, the communications connection(s) 610 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 602 can include one or more drive systems 614. In some examples, the vehicle 602 can have a single drive system 614. In at least one example, if the vehicle 602 has multiple drive systems 614, individual drive systems 614 can be positioned on opposite ends of the vehicle 602 (e.g., the front and the rear, etc.). In at least one example, the drive system(s) 614 can include one or more sensor systems to detect conditions of the drive system(s) 614 and/or the surroundings of the vehicle 602. By way of example and not limitation, the sensor system(s) can include one or more wheel encoders (e.g., rotary encoders) to sense rotation of the wheels of the drive systems, inertial sensors (e.g., inertial measurement units, accelerometers, gyroscopes, magnetometers, etc.) to measure orientation and acceleration of the drive system, cameras or other image sensors, ultrasonic sensors to acoustically detect objects in the surroundings of the drive system, lidar sensors, radar sensors, etc. Some sensors, such as the wheel encoders can be unique to the drive system(s) 614. In some cases, the sensor system(s) on the drive system(s) 614 can overlap or supplement corresponding systems of the vehicle 602 (e.g., sensor system(s) 606).

The drive system(s) 614 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 614 can include a drive system controller which can receive and preprocess data from the sensor system(s) and to control operation of the various vehicle systems. In some examples, the drive system controller can include one or more processors and memory communicatively coupled with the one or more processors. The memory can store one or more modules to perform various functionalities of the drive system(s) 614. Furthermore, the drive system(s) 614 also include one or more communication connection(s) that enable communication by the respective drive system with one or more other local or remote computing device(s).

The vehicle computing device 604 can be similar to the vehicle computing device 104 describe above with reference to FIG. 1. The vehicle computing device 604 can include one or more processors 620 and memory 622 communicatively coupled with the one or more processors 620. In at least one instance, the one or more processors 620 can be similar to the processor(s) 106 and the memory 622 can be similar to the memory 108 described above with reference to FIG. 1.

In the illustrated example, the memory 622 of the vehicle computing device 604 stores a localization component 624, a perception component 626, a planning component 628, one or more system controllers 630, a network measuring component 632, a map data component 634, a data portion component 636, a command receipt component 638, and a command verification component 640. Though depicted as residing in the memory 622 for illustrative purposes, it is contemplated that the localization component 624, the perception component 626, the planning component 628, one or more system controllers 630, the network measuring component 632, the map data component 634, the data portion component 636, the command receipt component 638, and the command verification component 640 can additionally, or alternatively, be accessible to the vehicle computing device 604 (e.g., stored in a different component of vehicle 602 and/or be accessible to the vehicle 602 (e.g., stored remotely).

The remote computing device 616 can include one or more processors and memory 646 communicatively coupled with the one or more processors 644. In at least one instance, the one or more processors 644 can be similar to the processor(s) 106 and the memory 646 can be similar to the memory 108 described above with reference to FIG. 1. In the illustrated example, the memory 646 of the computing device 616 stores a map data transmission component 648 and a command transmission component 650.

In memory 622 of the vehicle computing device 604, the localization component 624 can include functionality to receive data from the sensor system(s) 606 to determine a position of the vehicle 602. For example, the localization component 624 can include and/or request/receive a three-dimensional map of an environment and can continuously determine a location of the autonomous vehicle within the map. In some examples, the localization component 624 can use SLAM (simultaneous localization and mapping) or CLAMS (calibration, localization and mapping, simultaneously) to receive time-of-flight data, image data, lidar data, radar data, sonar data, IMU data, GPS data, wheel encoder data, or any combination thereof, and the like to accurately determine a location of the autonomous vehicle. In some examples, the localization component 624 can provide data to various components of the vehicle 602 to determine an initial position of an autonomous vehicle for generating a trajectory, as discussed herein.

The perception component 626 can include functionality to perform object detection, segmentation, and/or classification. In some examples, the perception component 626 can provide processed sensor data that indicates a presence of an entity that is proximate to the vehicle 602 and/or a classification of the entity as an entity type (e.g., car, pedestrian, cyclist, building, tree, road surface, curb, sidewalk, unknown, etc.). In additional and/or alternative examples, the perception component 626 can provide processed sensor data that indicates one or more characteristics associated with a detected entity and/or the environment in which the entity is positioned. In some examples, characteristics associated with an entity can include, but are not limited to, an x-position (global position), a y-position (global position), a z-position (global position), an orientation, an entity type (e.g., a classification), a velocity of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

The planning component 628 can determine a path for the vehicle 602 to follow to traverse through an environment. For example, the planning component 628 can determine various routes and paths and various levels of detail. In some examples, the planning component 628 can determine a route to travel from a first location (e.g., a current location) to a second location (e.g., a target location). For the purpose of this discussion, a route can be a sequence of waypoints for traveling between two locations. As non-limiting examples, waypoints include streets, intersections, global positioning system (GPS) coordinates, etc. Further, the planning component 628 can generate an instruction for guiding the autonomous vehicle along at least a portion of the route from the first location to the second location. In at least one example, the planning component 628 can determine how to guide the autonomous vehicle from a first waypoint in the sequence of waypoints to a second waypoint in the sequence of waypoints. In some examples, the instruction can be a path, or a portion of a path. In some examples, multiple paths can be substantially simultaneously generated (i.e., within technical tolerances) in accordance with a receding horizon technique. A single path of the multiple paths in a receding data horizon having the highest confidence level may be selected to operate the vehicle.

In other examples, the planning component 628 can alternatively, or additionally, use data from the perception component 626 to determine a path for the vehicle 602 to follow to traverse through an environment. For example, the planning component 628 can receive data from the perception component 626 regarding objects associated with an environment. Using this data, the planning component 628 can determine a route to travel from a first location (e.g., a current location) to a second location (e.g., a target location) to avoid objects in an environment. In at least some examples, such a planning component 628 may determine there is no such collision free path and, in turn, provide a path which brings vehicle 602 to a safe stop avoiding all collisions and/or otherwise mitigating damage.

In at least one example, the vehicle computing device 604 can include one or more system controllers 630, which can be configured to control steering, propulsion, braking, safety, emitters, communication, and other systems of the vehicle 602. These system controller(s) 630 can communicate with and/or control corresponding systems of the drive system(s) 614 and/or other components of the vehicle 602, which may be configured to operate in accordance with a path provided from the planning component 628.

The network measuring component 632 can determine network metrics at a current location of the vehicle 602. For example, as the vehicle 602 traverses through an environment, the network measuring component 632 can determine first network metric associated with network 642 and second network metric associated with network 618 using, in some examples, the communication connections 610. In some examples, the network 642 may be a cellular network and the network 618 may be associated with peer-to-peer connections between the vehicle 602 and a second vehicle and/or a third vehicle and/or network connection between the second vehicle and/or the third vehicle and the computing device 616. As discussed above, network metrics can include bandwidth data, signal strength data, latency data, jitter data, error rate data, time data, a capability status associated with the second vehicle and/or the third vehicle event data, and/or any other data that is available and/or measurable by the vehicle 602 that may assist the network measuring component 632 in determining whether to transmit the vehicle data via the 642 or the network 618. In some examples, the vehicle 602 can have multiple communication connections 610 and use a first communication connection to determine the first network metric and a second communication connection to determine the second network metric. In some examples, the vehicle 602 can also have multiple peer-to-peer communication connections 610 with multiple other vehicles and the network measuring component 632 can measuring network metrics associated with networks associated with those other vehicles. In some examples, the network measuring component 632 can correspond to or perform the functions of the transmission path determinator of FIG. 1.

The map data component 634 can access network map data associated with an environment. For example, the map data component 634 can be loaded with the network map data prior to operating the vehicle 602 in an environment. In some examples, the network map data can represent location and/or condition based network parameters such as bandwidth data, signal strength data, latency data, jitter data, error rate data. For example, condition data can include time data, weather data, event data, and the like. In some examples, the map data component 634 can request the network map data from a remote computing device 616. For example, the map data transmission component 648 of the computing device 616 can respond to the request and transmit the network map data to the map data component 634. Then the map data component 634 can store the network map data in the map data component 634. In some examples, the map data component 634 can request network map updates from the map data transmission component 648 to update the network map data stored in the map data component 634.

In some examples, the map data component 634 can be configured to update the network map data stored in the computing device 616 at the map data transmission component 648. For example, the network measuring component 632 can determine network parameters associated with a first network 618(1), a second network 618(2) and a third network 642. In some examples, the third network 642 may be the cellular network described in association with FIG. 1, as well as throughout this disclosure. Then, the map data component 634 can use the network parameters to determine a network map update which can be transmitted to the computing device 616 allowing other vehicles to obtain the updated network map data.

In some examples, the first network 618(1) may be associated with a second vehicle such as the second vehicle 116 of FIG. 1 and the second network 618(2) may be associated with a third vehicle that is a same type as the second vehicle 116 of FIG. 1. In some examples, the vehicle 602 and the networks 618(1) and 618(2) are in a peer to peer mesh network and the vehicle 602 can transmit vehicle data via the networks 618(1), 618(2), and/or 642 as described in association with FIG. 1.

The data portion component 636 can determine and/or configure the vehicle data for transmission. For example, the vehicle 602 can determine vehicle data by capturing sensor data using sensor system(s) 606. Additionally, in some examples, the vehicle 602 can determine vehicle data as including vehicle status data, vehicle diagnostic data, and/or vehicle telemetry. Based on the network parameters determined by the network measuring component 632, the data portion component 636 can determine portions of the vehicle data to transmit via different networks described in association with FIG. 5, as well as throughout this disclosure.

The command receipt component 638 can receive a command from the command transmission component 650 of the computing device 616. For example, the vehicle 602 can transmit the vehicle data to the computing device 616. As discussed above, the vehicle 602 can also send a request to a teleoperations device to obtain guidance to resolve uncertainty. The data portion component 636 can queue up portions of the vehicle data and cause it to be transmitted by the communication connections 610 via the networks 618 and/or 642 to the command transmission component 650. In some examples, the networks 618(1) and (2) may be associated with other vehicles and the third network 642 may be associated with a cellular network. Transmission via the networks 618 and/or 642 are described in association with FIGS. 1-5, as well as throughout this disclosure. The command transmission component can receive a command from a teleoperator and/or determine a command to be transmitted and sent to the command receipt component 638.

The command verification component 640 can verify the command received at the command receipt component 638. For example, the vehicle 602 can determine that the vehicle data transmitted to the computing device 616 can allow for a particular set of guidance to be received from the computing device 616 and/or the teleoperator. After receiving the command at the command receipt component 638, the command verification component 640 can determine if the received command falls within the set of guidance that is associated with the vehicle data transmitted to the computing device 616. In some examples, the command verification component 640 can ignore the received command. In some examples, the command verification component 640 can request an updated command. In some examples, the vehicle 602 can determine a set of utilities and/or user interfaces associated with the transmitted vehicle data such that the computing device 616 and/or the teleoperator must select a command from a limited set of commands.

The processor(s) 620 of the vehicle 602, the processor(s) 646 of the computing device 616, and the processor(s) 106 of the vehicle computing device 104 of FIG. 1 can be any suitable processor capable of executing instructions to process data and perform operations as described herein. By way of example and not limitation, the processor(s) 620, 646, and 106 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

The memory 622 of the vehicle 602, the memory 648 of the computing device 616, and the memory 108 of the vehicle computing device 104 of FIG. 1 are examples of non-transitory computer-readable media. The memory 622, 648, and 108 can store an operating system and one or more software applications, instructions, programs, and/or data to implement the methods described herein and the functions attributed to the various systems. In various implementations, the memory 622, 648, and 108 can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

In some examples, aspects of some or all of the components discussed herein can include any models, algorithms, and/or machine learning algorithms. For example, in some examples, the components in the memory 622, 648, and 108 can be implemented as a neural network.

Figure 7:
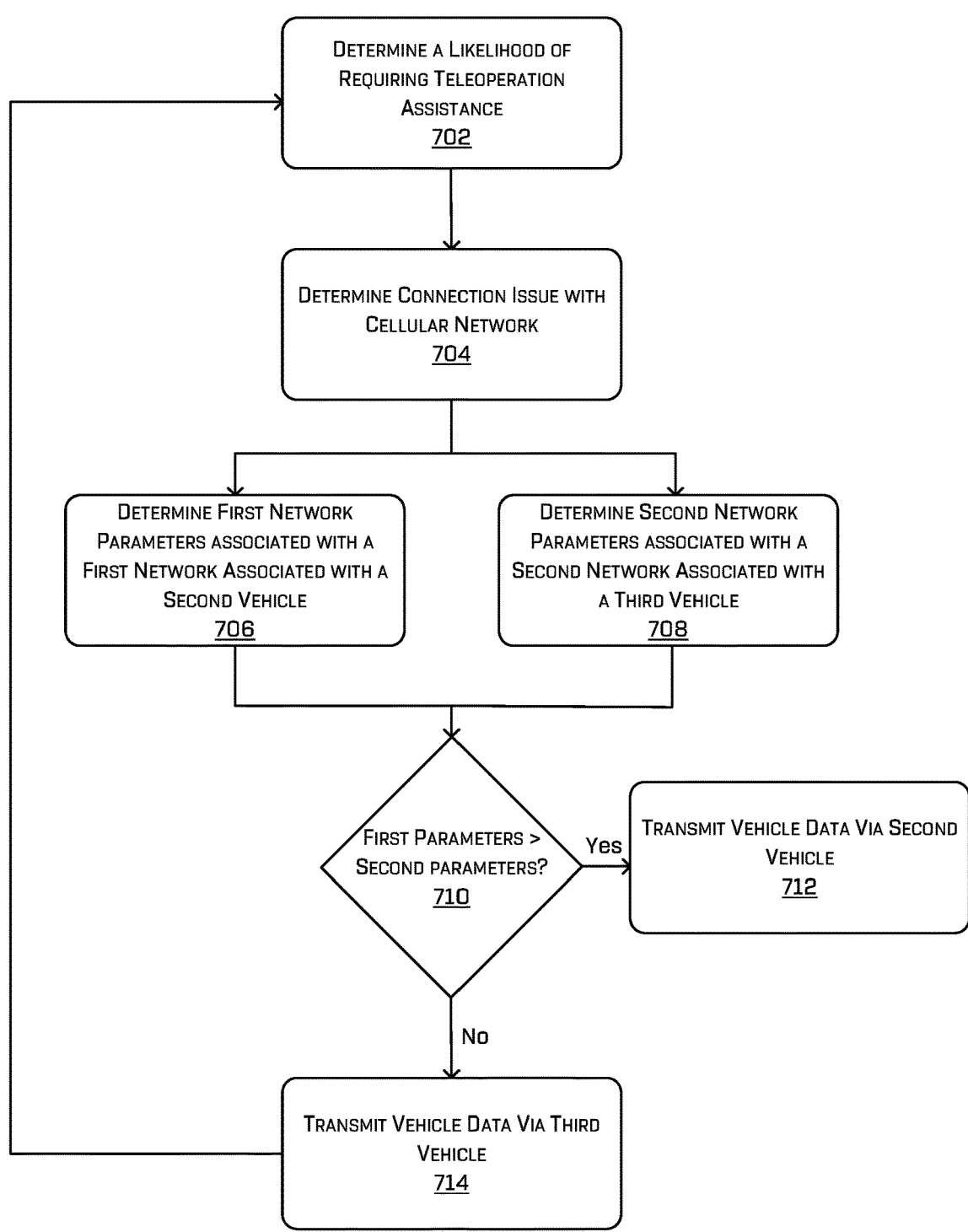
FIG. 7 depicts a flow diagram representative of one or more processes for an adaptive multi-vehicle data transmission architecture as described herein.

FIG. 7 depicts an example process 700 for using the adaptive multi-vehicle transmission architecture are described herein. In some examples, some or all of process 700 can be performed by one or more components described in association with FIGS. 1-6, as described herein. The process 700 are described with reference to the vehicle 102 in FIG. 1 and/or the vehicles 202, 302, 402, and/or 502 in FIGS. 2-5. Additionally, some portions of process 700 can be omitted, replaced, and/or reordered.

At operation 702, a first vehicle can determine a likelihood of requiring teleoperation assistance at a future time. Additional details with respect to the determining the likelihood are described in association with FIG. 1, as well as throughout this disclosure.

At operation 704, the first vehicle can, for example, using the network measuring component 632 can similarly determine that there is a connection issue with a cellular network that the first vehicle is connected to. For example, the network measuring component 632 can determine that the cellular network has insufficient bandwidth for transmitting the vehicle data and is therefore unavailable. Additional details with respect to the operation 704 are described in association with FIGS. 1-6, as well as throughout this disclosure.

At operation 706, the network measuring component 632 can determine first network parameters associated with a first network associated with a second vehicle such as bandwidth data, latency data, signal strength, and/or the like. In some examples, the first vehicle and the second vehicle may be in a fleet together. In some examples, the operation 706 may be performed to determine a suitability associated with the second vehicle. Additional details with respect to the operation 706 are described in association with FIGS. 1-6, as well as throughout this disclosure.

At operation 708, the network measuring component 632 can determine second network parameters associated with a second network associated with a third vehicle such as bandwidth data, latency data, signal strength, and/or the like. In some examples, the first vehicle and the third vehicle may be in a fleet together. In some examples, the operation 708 may be performed to determine a suitability associated with the third vehicle. Additional details with respect to the operation 708 are described in association with FIGS. 1-6, as well as throughout this disclosure.

At operation 710, the first vehicle can determine whether the first network parameters are greater than the second network parameters (e.g., whether the first network parameters indicate higher bandwidth, lower latency, and/or higher signal strength than the second network parameters). If yes (e.g., the first network parameters are greater), then at operation 712, the first vehicle can determine to transmit the vehicle data via the second vehicle. If no (e.g., the second network parameters are greater), then at operation 714, the first vehicle can determine to transmit the vehicle data via the third vehicle. Additional details with respect to the operations 710, 712 and 714 are described in association with FIGS. 1-6, as well as throughout this disclosure.

Figure 8:
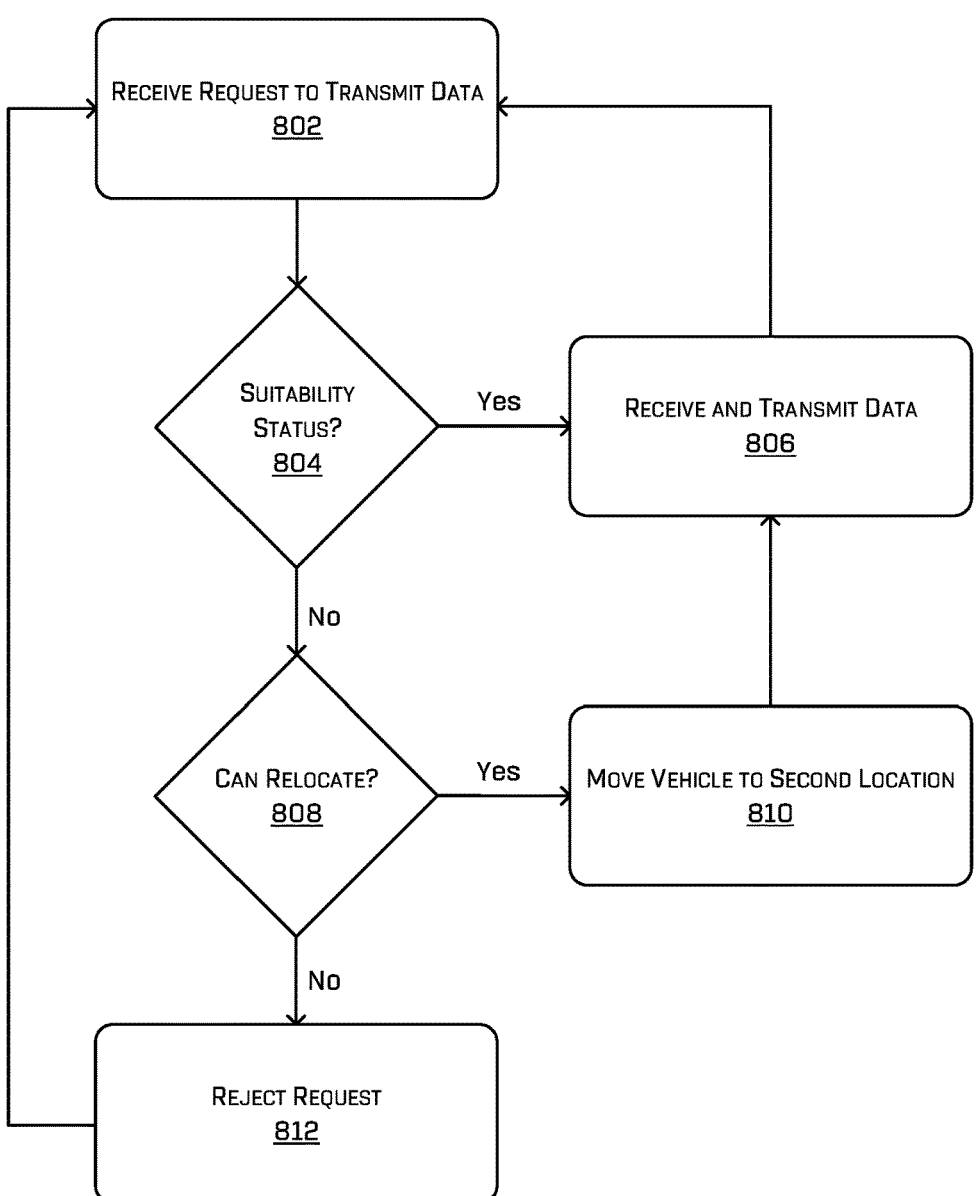
FIG. 8 depicts a flow diagram representative of one or more processes for the adaptive multi-vehicle data transmission architecture at a vehicle receiving data as described herein.

FIG. 8 depicts a second example process 800 for using the adaptive multi-vehicle transmission architecture are described herein. In some examples, some or all of process 800 can be performed by one or more components described in association with FIGS. 1-6, as described herein. The process 800 are described with reference to the second vehicle 116 in FIG. 1 and/or the vehicles 204, 304, 404, and/or 504 in FIGS. 2-5. Additionally, some portions of process 800 can be omitted, replaced, and/or reordered.

At operation 802, a second vehicle can receive, from a first vehicle, a request to use its network to transmit vehicle data to a remote computing device such as the remote computing device 120 of FIG. 1. Additional details with respect to the operation 802 are described in association with FIGS. 1-6, as well as throughout this disclosure.

At operation 804, the second vehicle, in response to the operation 802, can determine its suitability status in being a node to transmit the vehicle data to the remote computing device. Additional details with respect to the operation 804 are detailed in association with FIG. 1. If the second vehicle determines that it is suitable for transmitting the vehicle data to the remote computing device (e.g., the second vehicle has sufficient bandwidth), then at operation 806, the second vehicle would receive the vehicle data from the first vehicle and transmit the vehicle data to the remote computing device. Additional details with respect to operation 806 are detailed in association with FIGS. 1-6, as well as throughout this disclosure.

If the second vehicle determines, at the operation 804, that it is unsuitable for being a node to transmit the vehicle data to the remote computing device, the second vehicle can further determine whether the unsuitability is due to a connectivity issue. If so, the second vehicle can determine whether it can relocate from its current location to a second location such that at the second location, the connectivity issue would be resolved. In some examples, in this determination, the second vehicle can consider whether its current operations allow for the relocation to happen. For example, if the second vehicle is currently unoccupied and has no ride requests, thereby is in an idle state, the second vehicle can determine, based on its idle state, that it is free to relocate to the second location. In some example, the second vehicle may be in an idle state when it is on a road waiting to be maintenance. In some examples, the second vehicle may be relocated based on planned idle time such as planned maintenance or a break between passenger reservations. In some examples, idle times may be planned for all vehicles within the mesh network such that an idle vehicle is always capable of connecting to the remote computing device and transmit the vehicle data. As another example, if the second vehicle is currently occupied, but it determines that moving to the second location is already along its trajectory or moving to the second location would not affect a passenger's trip, then it can relocate to the second location. If, at operation 808, the vehicle determines that it can relocate, then at operation 810, the vehicle moves to the second location and performs the operation 806. However, if the second vehicle is currently occupied and cannot relocate to the second location without affecting the passenger's trip or is unoccupied but cannot move to the second location due to environmental issues such as weather, traffic, road construction, natural disaster, and/or the like, then at operation 812, the second vehicle will transmit to the first vehicle that it cannot accept its request. Additional details with respect to the operations 808-812 are described in association with FIGS. 1-6, as well as throughout this disclosure.

FIG. 9 depicts a third example process 900 for using the adaptive multi-vehicle transmission architecture are described herein. In some examples, some or all of process 900 can be performed by one or more components described in association with FIGS. 1-6, as described herein. The process 900 are described with reference to the vehicle 102 in FIG. 1 and/or the vehicles 202, 302, 402, and/or 502 in FIGS. 2-5. Additionally, some portions of process 900 can be omitted, replaced, and/or reordered.

At operation 902, a first vehicle can determine a likelihood of requiring teleoperation assistance at a future time. Additional details with respect to the determining the likelihood are described in association with FIG. 1, as well as throughout this disclosure.

At operation 904, the first vehicle can determine first network parameters associated with a first network associated with a second vehicle. Additional details with respect to the operation 904 are described in association with FIGS. 1-6, as well as throughout this disclosure.

At operation 906, the first vehicle can determine second network parameters associated with a second network associated with a third vehicle. Additional details with respect to the operation 904 are described in association with FIGS. 1-6, as well as throughout this disclosure.

At operation 908, the first vehicle can determine that the first network parameters and the second network parameters meet or exceed a threshold (e.g., the bandwidth associated with the first network and the bandwidth associated with the second network exceeds a threshold bandwidth). Additional details with respect to the operation 908 are described in association with FIGS. 1-6, as well as throughout this disclosure.

At operation 910, the first vehicle can associate, in response to the operation 908, a first portion of the vehicle data to the first network and/or the second vehicle. Additional details with respect to the operation 910 are described in association with FIGS. 1-6, as well as throughout this disclosure.

At operation 912, the first vehicle can associate, in response to the operation 908, a second portion of the vehicle data to the second network and/or the second vehicle. Additional details with respect to the operation 912 are described in association with FIGS. 1-6, as well as throughout this disclosure.

At operation 914, the first vehicle can simultaneously transmit the first portion and the second portion of the vehicle data to the remote computing device via the second vehicle and the third vehicle. Additional details with respect to the operation 914 are described in association with FIGS. 1-6, as well as throughout this disclosure.

FIG. 10 depicts a fourth example process 1000 for using the adaptive multi-vehicle transmission architecture are described herein. In some examples, some or all of process 1000 can be performed by one or more components described in association with FIGS. 1-6, as described herein. The process 1000 are described with reference to the vehicle 102 in FIG. 1 and/or the vehicles 202, 302, 402, and/or 502 in FIGS. 2-5. The process 1000 are also described with reference to the vehicles 404 and 406 in FIG. 4. Additionally, some portions of process 900 can be omitted, replaced, and/or reordered.

At operation 1002, a first vehicle can determine vehicle data to transmit to a remote computing device. Additional details with respect to the operation 1002 are described in association with FIGS. 1-6, as well as throughout this disclosure.

At operation 1004, the first vehicle can determine a second vehicle to connect to to transmit the vehicle data.

Additional details with respect to the operation 1004 are described in association with FIGS. 1 and 4, as well as throughout this disclosure.

At operation 1006, the first vehicle can, in response to the operation 1004, transmit the vehicle data to the second vehicle. Additional details with respect to the operation 1006 are described in association with FIGS. 1 and 4, as well as throughout this disclosure.

At operation 1008, the second vehicle can determine a third vehicle to connect to to transmit the vehicle data. Additional details with respect to the operation 1008 are described in association with FIGS. 1 and 4, as well as throughout this disclosure.

At operation 1010, the second vehicle can, in response to the operation 1008, transmit the vehicle data to the third vehicle. Additional details with respect to the operation 1010 are described in association with FIGS. 1 and 4, as well as throughout this disclosure.

At operation 1012, the third vehicle can transmit the vehicle data to the remote computing device. In some examples, the third vehicle can transmit the vehicle data to the remote computing device using either a cellular network or a direct connection to the remote computing device. Additional details with respect to the operation 1012 are described in association with FIGS. 1 and 4, as well as throughout this disclosure.

Figure 11:
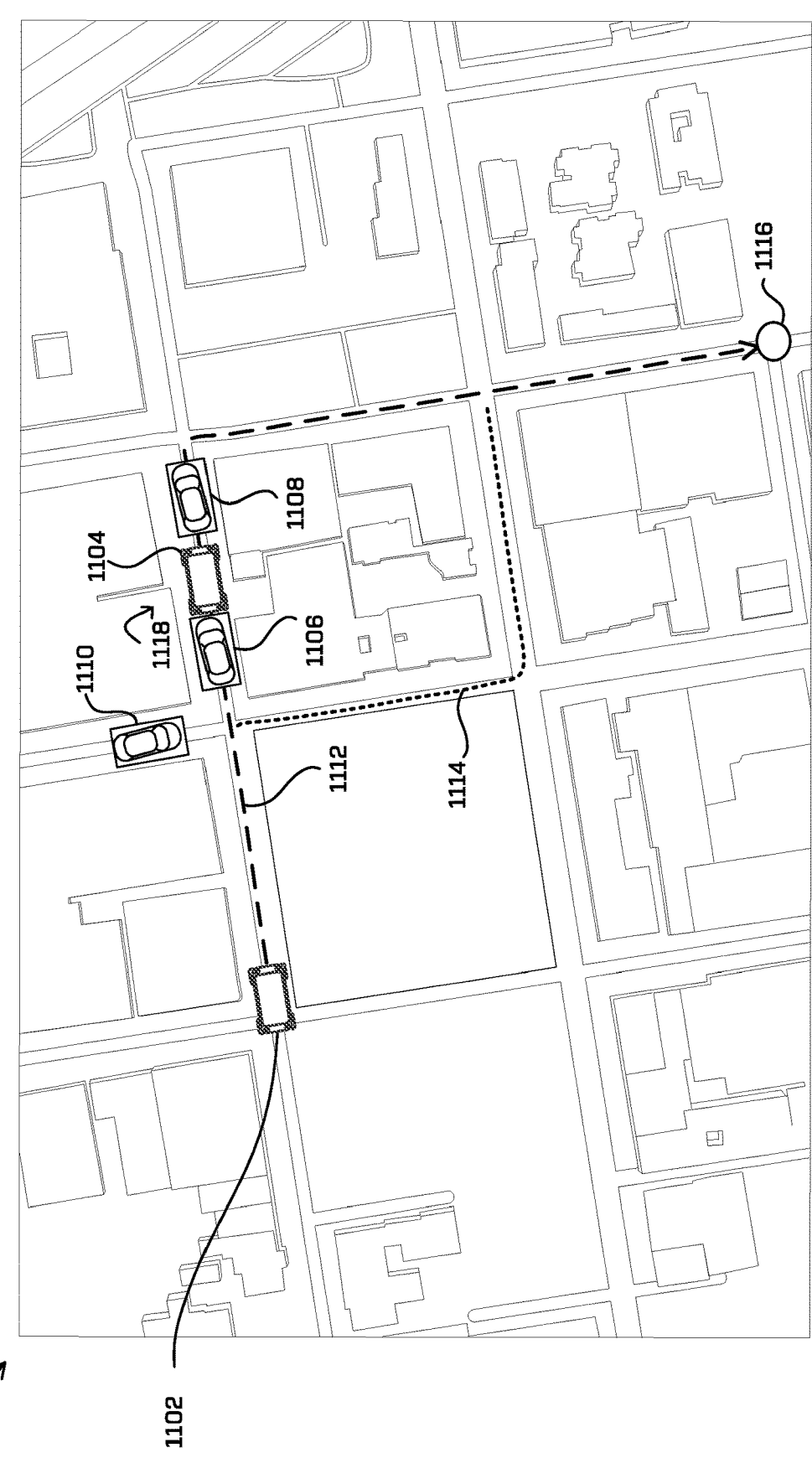
FIG. 11 depicts an example environment where a vehicle uses adaptive multi-vehicle data transmission to traverse the environment along an alternative trajectory.

FIG. 11 depicts an example environment 1100 where a vehicle uses adaptive multi-vehicle data transmission to traverse the environment along an alternative trajectory. The example environment 1100 includes a first vehicle 1102, a second vehicle 1104, a third vehicle 1106, a fourth vehicle 1108, and a fifth vehicle 1110. In some examples, the first vehicle 1102 may correspond to the vehicle 102 of FIG. 1 and the second vehicle 1104 may correspond to the second vehicle 116 of FIG. 1. In some examples, the first vehicle 1102 and the second vehicle 1104 may be in a same fleet. The vehicles 1102 and 1104, as illustrated in FIG. 11, communicate with each other via the vehicle-to-vehicle mesh network described throughout this disclosure.

In the example environment 1100, the first vehicle 1102 is configured to travel along a first trajectory 1112 to a first location 1116. The second vehicle 1104 is positioned at a second location 1118 that is along the first trajectory 1112. In some examples, the second vehicle 1104 can determine, for example, based on sensor data, that it requires teleoperation assistance (e.g., due to being surrounded by the vehicles 1106, 1108, and 1110). In some examples, the second vehicle 1104 can determine traffic data associated with the second location 1118 indicating that there is congestion being caused by vehicles 1106, 1108, and 1110. In some examples, the second vehicle 1104 can transmit its determination that it requires teleoperation assistance at the second location 1118, the reasons for requiring teleoperation assistance (e.g., due to vehicle congestion), and/or the traffic data associated with the second location 1118 to the first vehicle 1102 and/or other vehicles in the fleet via the vehicle-to-vehicle mesh network.

In some examples, the second vehicle 1104 can continuously determine data associated with needing teleoperation assistance, the traffic data, and/or the like that's associated with the second location 1118 to the first vehicle 1104 and/or the other vehicles via the vehicle-to-vehicle mesh network. In some examples, the first vehicle 1102 can continuously monitor a status of the second vehicle 1102 at the second location 1118 as the first vehicle 1102 approaches the second location 1118. In some examples, the first vehicle can determine, based on the data from the second vehicle 1104, that a likelihood of the first vehicle 1102 will require teleoperation when it arrives at the second location 1118 exceeds a threshold likelihood, and in response the first vehicle 1102 can determine a second trajectory 1114 that detours around the second location 1118 for safety reasons as well as to minimize needing to use teleoperation assistance. In some examples, the first vehicle 1102 can determine the second trajectory 1114 at a threshold time and/or a threshold distance before the first vehicle 1102 is projected to arrive at the second location 1118. In some examples, the first vehicle 1102 can transmit the second trajectory to the other vehicles on the vehicle-to-vehicle mesh network and inform the other vehicles to avoid the second location 1118.

In some examples, the second location 1118 may be associated with an event and the first vehicle 1102 may determine the second trajectory 1114 to avoid the second location 1118 until the event is over. In some examples, the second location 1118 may be associated with a pickup and/or dropoff location for one or more ridesharing and/or taxi services and the first vehicle 1102 may, in response, determine to avoid the second location unless picking up and/or dropping off passenger(s) at the second location 1118. In some examples, the second location 1118 may be associated, based for example on historical data gathered by other vehicles that have passed through the second location 1118, with poor cellular network connectivity and/or poor wireless connectivity to the vehicle-to-vehicle mesh network and the first vehicle 1102 can, in response, determine to avoid the second location 1118 to maintain its connection with both the vehicle-to-vehicle mesh network and the cellular network.

FIG. 12 depicts example scenarios 1200 where a vehicle is likely request teleoperation assistance. FIG. 12 includes a first scenario 1202 and a second scenario 1210. In some examples, a requirements determination component of the vehicle such as the requirements determination component 126 of FIG. 1 can determine a suitability of the vehicle to be a node for transmitting vehicle data based on the vehicle encountering or likely to encounter the first scenario 1202 or the second scenario 1210.

The first scenario 1202 depicts a view that a sensor of a vehicle such as the vehicle 102 of FIG. 1 may capture. The environment of the first scenario 1202 may correspond to the second location 1118 of FIG. 11. The first scenario 1202 includes multiple objects such as a second vehicle 1204, pedestrians 1206 and cyclists 1208. The vehicle can determine based on the number of objects detected by its sensor, that teleoperation assistance is required to assist in the vehicle passing through the intersection illustrated in the scenario 1202. The vehicle can determine to request and receive teleoperation assistance via the vehicle-to-vehicle mesh network and/or the cellular network. In some examples, upon requesting the teleoperation assistance, the vehicle can additionally log and update historical data that it requested the teleoperation assistance, why it requested the teleoperation assistance, a time data associated with the request, a weather data associated with the request, an event, if any, associated with the request, and/or the like. The updated historical data may be provided via the vehicle-to-vehicle mesh network to other vehicles connected to the vehicle-to-vehicle network. The other vehicles may, in the future, use the updated historical data to determine their likeliness of requiring teleoperation assistance when passing the second location 1118. For example, the historical data can indicate that the scene from the first scenario 1202 occurs early morning and early evening and therefore, other vehicles can determine a higher likeliness of requiring teleoperation assistance during early morning or early evening.

In some examples, the vehicle can further determine that because of all of the objects in the scenario 1202, that there is degraded cellular network connectivity (e.g., bandwidth below threshold, latency below threshold, and/or signal strength below threshold) and in response determine to transmit the teleoperation request using the vehicle-to-vehicle mesh network. In some examples, the degraded cellular network connectivity may be included in the historical data and other vehicles may, based on the historical data, prioritize using the vehicle-to-vehicle mesh network over the cellular network when passing through the second location 1118. For example, the historical data can indicate that Additionally, in some examples, due to the historical data indicating that the second location 1118 is associated with the degraded cellular network connectivity and the need to use the vehicle-to-vehicle mesh network, vehicles on the mesh network may be positioned proximate the second location 1118 and/or rotated through the second location 1118 to ensure good connectivity on the mesh network at the second location 1118.

The second scenario 1210 illustrates a drop-off and/or pickup location associated with the vehicle 1212. In some examples, the vehicle 1212 may correspond to the vehicle 102 of FIG. 1. As illustrated, in the scenario 1210, the vehicle 1212 is picking up the passenger 1216. The scenario 1210 illustrates multiple other vehicles 1226, 1228, and 1230 also park at/or picking up and/or dropping off passengers. The vehicle 1212 was originally configured to pickup the passenger at the first parking location 1214, but determines that an obstacle 1222 is occupying the first parking location 1214. In response, the vehicle 1212 can determine requiring teleoperation assistance to find a new pickup location. The teleoperator can determine that the vehicle can pick up the passenger 1216 at the second parking location 1224 that is proximate a shelter 1220. The teleoperator can provide instructions for the vehicle 1212 to relocate to the parking location 1224 (as illustrated by the arrows) and/or for the passenger to relocate to the shelter 1220 for pickup along route 1218.

Similar to the first scenario 1202, the vehicle 1212 can determine to request and receive the teleoperation assistance via the vehicle-to-vehicle mesh network and/or the cellular network. In some examples, upon requesting the teleoperation assistance, the vehicle 1212 can additionally log and update historical data that it requested the teleoperation assistance, why it requested the teleoperation assistance, a time data associated with the request, a weather data associated with the request, an event, if any, associated with the request, and/or the like. The updated historical data may be provided via the vehicle-to-vehicle mesh network to other vehicles connected to the vehicle-to-vehicle network. The other vehicles may, in the future, use the updated historical data to determine their likeliness of requiring teleoperation assistance when dropping off/picking up passenger(s) at the location associated with the second scenario 1210.

In some examples, the vehicle 1212 can further determine that because of all of the vehicles 1226, 1228, and 1230 picking up and/or dropping off passengers and/or because the vehicle 1212 is proximate a pickup and/or dropoff location to prioritize using the vehicle-to-vehicle mesh network for teleoperation assistance requests. In some examples, this may be because the historical data indicates that there is degraded cellular network connectivity (e.g., bandwidth below threshold, latency below threshold, and/or signal strength below threshold). Additionally, in some examples, due to the historical data indicating that the location associated with the second scenario 1210 is associated with the degraded cellular network connectivity and the need to use the vehicle-to-vehicle mesh network, vehicles on the mesh network may be positioned proximate the location illustrated in scenario 1210 and/or rotated through the location illustrated in scenario 1210 to ensure good connectivity on the mesh network at the this location.

Figure 13:
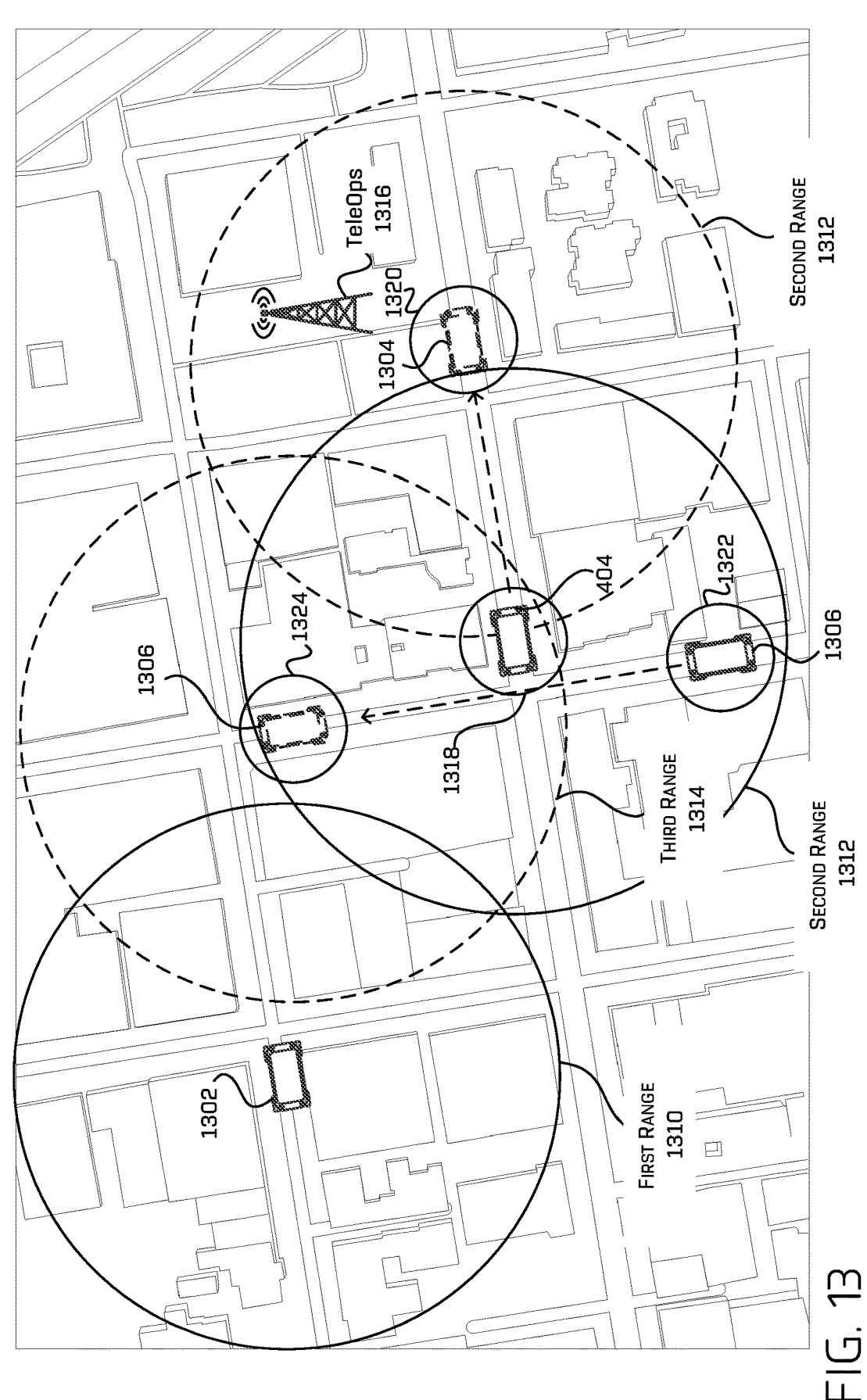
FIG. 13 depicts another alternative example environment with a vehicle traversing using an adaptive multi-vehicle data transmission architecture.

FIG. 13 illustrates an example environment 1300 which can be similar to the example environment 400 described above with reference to FIG. 4. FIG. 13 illustrates a first vehicle 1302, a second vehicle 1304, and a third vehicle 1306. In some examples, the first vehicle 1302 can correspond to the first vehicle 102 and the first vehicle 202 described in association with FIGS. 1 and 2 and the second vehicle 1304 can correspond to the second vehicle 116 and the second vehicle 204 described in association with FIGS. 1 and 2, and the teleops 1316 can correspond with the remote computing device 120 described in association with FIG. 1.

In some examples, the first vehicle 1302, the second vehicle 1304, and the third vehicle 1306 may be in a fleet together. In some examples, the first vehicle 1302, the second vehicle 1304, and the third vehicle 1306 may be connected via a vehicle-to-vehicle (e.g., peer-to-peer) mesh network. In such an example, the first vehicle 1302 may be a first node within the mesh network, the second vehicle 1304 may be a second node within the mesh network, and the third vehicle 1306 may be a third node within the mesh network.

FIG. 13 also illustrates a first range 1310, a second range 1312, and a third range 1314 that illustrates the maximum range each of the vehicles 1302, 1304, and 1306, respectively, has as a node within the mesh network. In some examples, the more each of the illustrated ranges overlap, the better bandwidth, latency, and/or signal strength between the vehicles, and the less each of the illustrated overlap, the worse bandwidth, latency, and/or signal strength between the vehicles. For example, as illustrated, the connection between the second vehicle 1304 and the third vehicle 1306 when the third vehicle 1306 is at the fourth location 1324 contains better bandwidth, latency, and/or signal strength than the connection between the first vehicle 1302 and the second vehicle 1304 because there is greater overlap between the third range 1314 and the second range 1312 than the first range 1310 and the second range 1312. In FIG. 13, the solid vehicles and solid network ranges represent the vehicle and network range at current locations and times, and the dashed vehicles and network ranges represent the vehicles and network ranges in future locations.

In the illustrated example of FIG. 13, the first vehicle 1302, the second vehicle 1304 at a first location 1318, and the third vehicle 1306 at a third location 1322 cannot communicate directly with the teleops 1316. As a result, the first vehicle 1302 and/or any of the vehicles on the mesh network (e.g., the second vehicle 1304 or the vehicle 1306) can determine a second location 1320 to relocate the second vehicle 1304 to such that the teleops 1316 is within range of the second network range 1312. The vehicles 1302, 1304 and/or 1306 can further determine, because there will be gap in the mesh network when the second vehicle 1304 relocates from the first location 1318 to the second location 1320, to also relocate the third vehicle from the third location 1322 to a fourth location 1324 such that the gap is filled by the third network range 1314 that's associated with the third vehicle 1306. In such an example, if the vehicle 1302 uses the mesh network to transmit the vehicle data to teleops 1316, the vehicle data would be transmitted first via the third vehicle 1306 and then via the second vehicle 1304, where the third vehicle 1306 transmits the vehicle data to the teleops 1316.

In some examples, due to the importance of being able to request teleoperation assistance at all times, the vehicles 1302, 1304, 1306, and/or the other vehicles on the mesh network can determine to rotate and/or position a vehicle that is connected to the mesh network at or proximate the second location 1320 such that the vehicles on the mesh network will have a constant and stable connection with the teleops 1316 for use in teleoperation assistance.

Alternatively, in some examples, instead of moving the vehicles 1304 and 1306, the first vehicle 1302 can determine to relocate to the second location 1320 such that the teleops 1316 is within the first range 1310.

While FIG. 13 illustrates that the second vehicle 1304 communicates with the teleops 1316 using a direct wireless connection (e.g., peer-to-peer), the second vehicle 1304 may also or alternatively communicate with the teleops 1316 using a cellular network as described in association with FIGS. 1 and 2, as well as throughout this disclosure.

Accordingly, the techniques discussed herein provide a robust implementation of an adaptive multi-vehicle data transmission architecture to allow a vehicle maintain and/or optimize network availability and to continue operating in a safe manner.

Example Clauses

A: A system comprising: a first autonomous vehicle; and a second autonomous vehicle, the first autonomous vehicle comprising: a first modem, a second modem; a sensor; a processor; and a computer-readable medium storing computer-executable instructions that, when executed, cause the system to perform operations comprising: capturing, using the sensor, sensor data of an environment; determining a likelihood associated with the first autonomous vehicle requiring teleoperation assistance from a remote computing device; determining, based at least in part on the likelihood and using the first modem, first network metric associated with a cellular network for transmitting data between the first autonomous vehicle and the remote computing device; determining, based at least in part on the likelihood and using the second modem, second network metric associated with a first wireless connection between the first autonomous vehicle and the second autonomous vehicle and a second wireless connection for transmitting data between the second autonomous vehicle and the remote computing device; determining, based at least in part on the first network metric exceeding the second network metric, to transmit the sensor data to the remote computing device via the cellular network; determining, based at least in part on the second network metric exceeding the first network metric, to transmit the sensor data to the second autonomous vehicle via the first wireless connection, the second autonomous vehicle being configured to transmit the sensor data to the remote computing device via the second wireless connection.

B: The system of paragraph A, wherein determining the likelihood comprises: determining, based at least in part on historical data, that a trajectory of the first autonomous vehicle passes a densely populated location.

C: The system of paragraph A or B, wherein determining to transmit the sensor data to the second autonomous vehicle further comprises determining that a computing requirement associated with the second autonomous vehicle is below a threshold computing requirement.

D: The system of paragraph C, wherein determining to transmit the sensor data to the second autonomous vehicle further comprises determining that a data transmission requirement associated with the second autonomous vehicle exceeds a connectivity threshold, the data transmission requirement comprising one or more of: first bandwidth data associated with the first wireless connection; second bandwidth data associated with the second wireless connection; first latency data associated with the first wireless connection; or second latency data associated with the second wireless connection.

E: The system of any of paragraphs A-D, wherein determining to transmit the sensor data via the first wireless connection comprises: determining a current location associated with the second autonomous vehicle; determining a second location for the second autonomous vehicle that would increase the second network metric; and causing the second autonomous vehicle to travel to the second location, wherein the second autonomous vehicle is configured to transmit the sensor data via the second wireless connection to the remote computing device after arriving at the second location.

F: A method comprising: determining a state associated with a first vehicle; determining a connectivity metric associated with a first wireless connection between the first vehicle and a remote computing device; determining, based at least in part on the state, a second vehicle configured to communicate with the remote computing device via a second wireless connection and to communicate with the first vehicle via a third wireless connection; determining a suitability metric associated with the second vehicle; determining, based at least in part on the connectivity metric, the suitability metric, and the state, to transmit vehicle data associated with the first vehicle from the first vehicle to at least one of: the remote computing device via the first wireless connection; or the second vehicle via the third wireless connection, wherein the second vehicle is configured to further transmit the vehicle data to the remote computing device via the second wireless connection.

G: The method of paragraph F, wherein the state is a future state comprising a likelihood of the first vehicle requiring teleoperation assistance.

H: The method of paragraph F or G, wherein the remote computing device is associated with teleoperation assistance and wherein the state is a future state comprising a likelihood of the first vehicle requesting the teleoperation assistance and is determined based at least in part on at least one of: event data; traffic data; location data; or weather data.

I: The method of any of paragraphs F-H, wherein the suitability metric comprises at least one of: a likelihood associated with the second vehicle requiring teleoperation assistance; a transmission requirement associated with the second vehicle; or a computing requirement associated with the second vehicle.

J: The method of paragraph I, wherein the transmission requirement comprises at least one of: bandwidth data between the second vehicle and the remote computing device; signal strength data between the second vehicle and the remote computing device; latency data between the second vehicle and the remote computing device; or error rate data between the second vehicle and the remote computing device.

K: The method of paragraph I or J, wherein the computing requirement comprises at least one of: location data; passengers data associated with the second vehicle; weather data; or road condition data.

L: The method of paragraph J, wherein determining the transmission requirement further comprises: determining that, while the second vehicle is at a first location, the transmission requirement is below a threshold; determining a second location different from the first location, wherein at the second location, the transmission requirement meets or exceeds the threshold.

M: The method of paragraph L, wherein determining to transmit the vehicle data to the second vehicle comprises determining to transmit the vehicle data after the second vehicle arrives at the second location.

N: The method of any of paragraphs F-M, wherein the suitability metric is a first suitability metric, the method further comprising: determining a third vehicle configured to communicate with the remote computing device via a fourth wireless connection, wherein the third vehicle is configured to communicate with the first vehicle via a fifth wireless connection and the second vehicle via a sixth wireless connection; determining a second suitability metric associated with the third vehicle; and determining, based at least in part on the first suitability metric and the second suitability metric, to transmit a first portion of the vehicle data to the second vehicle and to transmit a second portion of the vehicle data to the third vehicle.

O: The method of any of paragraphs F-N, wherein state is a future state that is associated with a location, further comprising: receiving a first trajectory associated with a third vehicle, the third vehicle configured to communicate with the first vehicle via a fourth wireless connection and the first trajectory is configured to pass through the location; and determining, based at least in part on the future state, to transmit to the third vehicle to control the third vehicle, a second trajectory different from first trajectory, the second trajectory configured to avoids passing through the location.

P: A non-transitory computer-readable medium storing instructions executable by a processor, wherein the instructions, when executed, cause the processor to perform operations comprising: determining a state associated with a first vehicle; determining a connectivity metric associated with a first wireless connection between the first vehicle and a remote computing device; determining, based at least in part on the state, a second vehicle configured to communicate with the remote computing device via a second wireless connection and to communicate with the first vehicle via a third wireless connection; determining a suitability metric associated with the second vehicle; determining, based at least in part on the connectivity metric, the suitability metric, and the state, to transmit vehicle data associated with the first vehicle from the first vehicle to at least one of: the remote computing device via the first wireless connection; or the second vehicle via the third wireless connection, wherein the second vehicle is configured to further transmit the vehicle data to the remote computing device via the second wireless connection.

Q: The non-transitory computer-readable medium of paragraph P, wherein the state is a future state comprising a likelihood of the first vehicle requiring tele-operation assistance.

R: The non-transitory computer-readable medium of paragraph P or Q, wherein the suitability metric comprises at least one of: a likelihood associated with the second vehicle requiring teleoperation assistance; a transmission requirement associated with the second vehicle; or a computing requirement associated with the second vehicle.

S: The non-transitory computer-readable medium of paragraph R, wherein the computing requirement comprises at least one of: location data; passengers data associated with the second vehicle; weather data; or road condition data.

T: The non-transitory computer-readable medium of any of paragraphs P-S, wherein the suitability metric is a first suitability metric, the operations further comprising: determining a third vehicle configured to communicate with the remote computing device via a fourth wireless connection, wherein the third vehicle is configured to communicate with the first vehicle via a fifth wireless connection and the second vehicle via a sixth wireless connection; determining a second suitability metric associated with the third vehicle; and determining, based at least in part on the first suitability metric and the second suitability metric, to transmit a first portion of the vehicle data to the second vehicle and to transmit a second portion of the vehicle data to the third vehicle.

While the example clauses described above are described with respect to one particular implementation, it should be understood that, in the context of this document, the content of the example clauses can also be implemented via a method, device, system, and/or computer-readable medium.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:

a first autonomous vehicle; and a second autonomous vehicle, the first autonomous vehicle comprising:

a first modem, a second modem;

a sensor;

a processor; and a computer readable medium storing computer executable instructions that, when executed, cause the system to perform operations comprising:

capturing, using the sensor, sensor data of an environment;

determining a likelihood associated with the first autonomous vehicle requiring teleoperation assistance from a remote computing device;

determining, based at least in part on the likelihood and using the first modem, first network metric associated with a cellular network for transmitting data between the first autonomous vehicle and the remote computing device;

determining, based at least in part on the likelihood and using the second modem, second network metric associated with a first wireless connection between the first autonomous vehicle and the second autonomous vehicle and a second wireless connection for transmitting data between the second autonomous vehicle and the remote computing device;

controlling, based at least in part on the first network metric exceeding the second network metric, the first autonomous vehicle to transmit the sensor data to the remote computing device via the cellular network;

controlling, based at least in part on the second network metric exceeding the first network metric, the first autonomous vehicle to transmit the sensor data to the second autonomous vehicle via the first wireless connection, the second autonomous vehicle being configured to transmit the sensor data to the remote computing device via the second wireless connection.

2. The system of claim 1, wherein determining the likelihood comprises:

determining, based at least in part on historical data, that a trajectory of the first autonomous vehicle passes a densely populated location.

3. The system of claim 1, wherein determining to transmit the sensor data to the second autonomous vehicle further comprises determining that a computing requirement associated with the second autonomous vehicle is below a threshold computing requirement.

4. The system of claim 3, wherein determining to transmit the sensor data to the second autonomous vehicle further comprises determining that a data transmission requirement associated with the second autonomous vehicle exceeds a connectivity threshold, the data transmission requirement comprising one or more of:

first bandwidth data associated with the first wireless connection;

second bandwidth data associated with the second wireless connection;

first latency data associated with the first wireless connection; or second latency data associated with the second wireless connection.

5. The system of claim 1, wherein determining to transmit the sensor data via the first wireless connection comprises:

determining a current location associated with the second autonomous vehicle;

determining a second location for the second autonomous vehicle that would increase the second network metric; and causing the second autonomous vehicle to travel to the second location, wherein the second autonomous vehicle is configured to transmit the sensor data via the second wireless connection to the remote computing device after arriving at the second location.

6. A method comprising:

determining a state associated with a first vehicle;

determining a connectivity metric associated with a first wireless connection between the first vehicle and a remote computing device;

determining, based at least in part on the state, a second vehicle configured to communicate with the remote computing device via a second wireless connection and to communicate with the first vehicle via a third wireless connection;

determining a suitability metric associated with the second vehicle;

controlling, based at least in part on the state and comparing the connectivity metric, to the suitability metric, the first vehicle to transmit vehicle data associated with the first vehicle from the first vehicle to at least one of:

the remote computing device via the first wireless connection; or the second vehicle via the third wireless connection, wherein the second vehicle is configured to further transmit the vehicle data to the remote computing device via the second wireless connection.

7. The method of claim 6, wherein the state is a future state comprising a likelihood of the first vehicle requiring teleoperation assistance.

8. The method of claim 6, wherein the remote computing device is associated with teleoperation assistance and wherein the state is a future state comprising a likelihood of the first vehicle requesting the teleoperation assistance and is determined based at least in part on at least one of:

event data;

traffic data;

location data; or weather data.

9. The method of claim 6, wherein the suitability metric comprises at least one of:

a likelihood associated with the second vehicle requiring teleoperation assistance;

a transmission requirement associated with the second vehicle; or a computing requirement associated with the second vehicle.

10. The method of claim 9, wherein the transmission requirement comprises at least one of:

bandwidth data between the second vehicle and the remote computing device;

signal strength data between the second vehicle and the remote computing device;

latency data between the second vehicle and the remote computing device; or error rate data between the second vehicle and the remote computing device.

11. The method of claim 9, wherein the computing requirement comprises at least one of:

location data;

passengers data associated with the second vehicle;

weather data; or road condition data.

12. The method of claim 10, wherein determining the transmission requirement further comprises:

US 12,669,826 B1

41 determining that, while the second vehicle is at a first location, the transmission requirement is below a threshold;

determining a second location different from the first location, wherein at the second location, the transmission requirement meets or exceeds the threshold.

13. The method of claim 12, wherein determining to transmit the vehicle data to the second vehicle comprises determining to transmit the vehicle data after the second vehicle arrives at the second location.

14. The method of claim 6, wherein the suitability metric is a first suitability metric, the method further comprising:

determining a third vehicle configured to communicate with the remote computing device via a fourth wireless connection, wherein the third vehicle is configured to communicate with the first vehicle via a fifth wireless connection and the second vehicle via a sixth wireless connection;

determining a second suitability metric associated with the third vehicle; and determining, based at least in part on the first suitability metric and the second suitability metric, to transmit a first portion of the vehicle data to the second vehicle and to transmit a second portion of the vehicle data to the third vehicle.

15. The method of claim 6, wherein state is a future state that is associated with a location, further comprising:

receiving a first trajectory associated with a third vehicle, the third vehicle configured to communicate with the first vehicle via a fourth wireless connection and the first trajectory is configured to pass through the location; and determining, based at least in part on the future state, to transmit to the third vehicle to control the third vehicle, a second trajectory different from first trajectory, the second trajectory configured to avoids passing through the location.

16. A non transitory computer readable medium storing instructions executable by a processor, wherein the instructions, when executed, cause the processor to perform operations comprising:

determining a state associated with a first vehicle;

determining a connectivity metric associated with a first wireless connection between the first vehicle and a remote computing device;

determining, based at least in part on the state, a second vehicle configured to communicate with the remote computing device via a second wireless connection and to communicate with the first vehicle via a third wireless connection;

42 determining a suitability metric associated with the second vehicle;

controlling, based at least in part on the state and comparing the connectivity metric, to the suitability metric, the first vehicle to transmit vehicle data associated with the first vehicle from the first vehicle to at least one of:

the remote computing device via the first wireless connection; or the second vehicle via the third wireless connection, wherein the second vehicle is configured to further transmit the vehicle data to the remote computing device via the second wireless connection.

17. The non-transitory computer-readable medium of claim 16, wherein the state is a future state comprising a likelihood of the first vehicle requiring teleoperation assistance.

18. The non transitory computer readable medium of claim 16, wherein the suitability metric comprises at least one of:

a likelihood associated with the second vehicle requiring teleoperation assistance;

a transmission requirement associated with the second vehicle; or a computing requirement associated with the second vehicle.

19. The non transitory computer readable medium of claim 18, wherein the computing requirement comprises at least one of:

location data;

passengers data associated with the second vehicle;

weather data; or road condition data.

20. The non transitory computer readable medium of claim 16, wherein the suitability metric is a first suitability metric, the operations further comprising:

determining a third vehicle configured to communicate with the remote computing device via a fourth wireless connection, wherein the third vehicle is configured to communicate with the first vehicle via a fifth wireless connection and the second vehicle via a sixth wireless connection;

determining a second suitability metric associated with the third vehicle; and determining, based at least in part on the first suitability metric and the second suitability metric, to transmit a first portion of the vehicle data to the second vehicle and to transmit a second portion of the vehicle data to the third vehicle.

* * * * *